United States Patent
Noma et al.

(10) Patent No.: US 12,288,554 B2
(45) Date of Patent: Apr. 29, 2025

(54) INFORMATION PROCESSING APPARATUS, INFORMATION PROCESSING SYSTEM, AND INFORMATION PROCESSING METHOD

(71) Applicant: SONY GROUP CORPORATION, Tokyo (JP)

(72) Inventors: Hideki Noma, Tokyo (JP); Katsutoshi Kanamori, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 166 days.

(21) Appl. No.: 17/759,095

(22) PCT Filed: Jan. 19, 2021

(86) PCT No.: PCT/JP2021/001602
§ 371 (c)(1),
(2) Date: Jul. 19, 2022

(87) PCT Pub. No.: WO2021/153325
PCT Pub. Date: Aug. 5, 2021

(65) Prior Publication Data
US 2023/0026093 A1 Jan. 26, 2023

(30) Foreign Application Priority Data
Jan. 27, 2020 (JP) .................. 2020-010576

(51) Int. Cl.
*G10L 15/22* (2006.01)
*G10L 15/06* (2013.01)

(52) U.S. Cl.
CPC .............. *G10L 15/22* (2013.01); *G10L 15/06* (2013.01); *G10L 2015/223* (2013.01)

(58) Field of Classification Search
CPC .... G10L 15/22; G10L 15/06; G10L 2015/223
(Continued)

(56) References Cited

U.S. PATENT DOCUMENTS

| 11,908,465 B2* | 2/2024 | Sohn ................. G10L 17/22 |
| 2007/0033040 A1* | 2/2007 | Huang ............. G10L 15/1822 |
| | | 704/254 |

(Continued)

FOREIGN PATENT DOCUMENTS

| CN | 107871502 A | 4/2018 | |
| CN | 113593573 B * | 1/2024 | ............. G08C 23/02 |

(Continued)

OTHER PUBLICATIONS

D. Kitakoshi, S. Hirose, A. Yamashita, M. Suzuki and K. Suzuki, "Development of an Intelligent Dialogue Agent for Older Adults : Evaluation of Functions to Control Spontaneous Talk and Coordinate Speech Content," 2019 International Conference on Technologies and Applications of Artificial Intelligence (Year: 2019).*

(Continued)

*Primary Examiner* — Bharatkumar S Shah
(74) *Attorney, Agent, or Firm* — CHIP LAW GROUP

(57) ABSTRACT

An information processing apparatus includes an acquisition unit that acquires, from a storage unit that stores episode data of a speaker, the episode data regarding topic information included in utterance data of the speaker. The information processing apparatus further includes an interaction control unit that controls an interaction with the speaker so as to include an episode based on the episode data.

13 Claims, 16 Drawing Sheets

(58) Field of Classification Search
USPC .................................................. 704/275
See application file for complete search history.

(56) References Cited

U.S. PATENT DOCUMENTS

| | | | | |
|---|---|---|---|---|
| 2010/0131988 | A1* | 5/2010 | Kent, Jr. ............ | H04N 21/8405 725/58 |
| 2020/0334345 | A1* | 10/2020 | Young ..................... | G06F 21/32 |
| 2021/0149949 | A1* | 5/2021 | Alexander .............. | G06F 16/35 |
| 2021/0232807 | A1* | 7/2021 | Asukai ................. | G06V 40/171 |

FOREIGN PATENT DOCUMENTS

| | | |
|---|---|---|
| JP | 2002-169804 A | 6/2002 |
| JP | 2003-280683 A | 10/2003 |
| JP | 2015-195998 A | 11/2015 |
| JP | 2017-062602 A | 3/2017 |
| JP | 2018-054790 A | 4/2018 |

OTHER PUBLICATIONS

M. Bono, Y. Sumi and T. Nishida, "Towards Achieving Complex Medical Engineering to Understand Conversational Dynamics," 2007 IEEE/ICME International Conference on Complex Medical Engineering, Beijing, China, 2007, pp. 474-478, doi: 10.1109/ICCME.2007.4381779. keywords: {Biomedical engineering; Biomedi (Year: 2007).*

International Search Report and Written Opinion of PCT Application No. PCT/JP2021/001602, issued on Apr. 6, 2021, 09 pages of ISRWO.

Office Action for JP Patent Application No. 2021-574650, issued on Feb. 4, 2025, 02 pages of English Translation and 02 pages of Office Action.

\* cited by examiner

FIG. 5

| Ep_id | When | Who | Where | Action | State | Target | Why | How | With | Cause |
|---|---|---|---|---|---|---|---|---|---|---|
| Ep1 | YESTERDAY | TANAKA | HOME | PAT | – | aibo | – | – | – | Ep2 |
| Ep2 | YESTERDAY | Aibo | HOME | – | HAPPY | – | – | – | – | – |
| Ep3 | THIS MORNING | TANAKA | – | EAT | – | CURRY | HUNGRY | QUICKLY | YAMADA | – |
| Ep4 | RECENTLY | YAMADA | – | RUN | – | TOILET | – | DASH | – | Ep5 |
| Ep5 | – | YAMADA | – | FALL DOWN | – | – | – | – | – | – |
| Ep6 | TOMORROW | EVERYONE | IZU | GET INTO | – | HOT SPRING | – | – | – | – |

FIG. 6

| CLASSIFICATION | TEMPLATE |
|---|---|
| PAST (1) | (when)(who)(where+de)(why+kara)(with)to(target)(how)(action+ta)yone |
| PAST (2) | (when)(who)(where+de)(why+kara)(with)to(target)(how)(action+te)(state+ta)yone |
| FUTURE | (when)(who)(where+de)(why+kara)(with)to(target)(how)(action end-form)ndesho |
| DURING CONVERSATION (CURRENTLY RECOGNIZING) | (when)(who)(where+de)(why+kara)(with)to(target)(how)(action end-form)ne |

| DEPENDENCY STRUCTURE | PHRASE | CASE |
|---|---|---|
| YESTERDAY ─┐ | NOUN PHRASE | TIME CASE |
| TARO ─┐ | NOUN PHRASE | NOMINATIVE CASE |
| AT HOME ─┐ | NOUN PHRASE | CAUSAL CASE |
| BECAUSE IT WAS COLD ─┐ | ADJECTIVE PHRASE | OPERATION MODIFIER CLAUSE |
| HEATER ─┐ | NOUN PHRASE | OBJECTIVE CASE |
| IMMEDIATELY ─┐ | ADVERBIAL PHRASE | OPERATION MODIFIER CLAUSE |
| TURNED ON | VERBAL PHRASE | PREDICATE CLAUSE |

D1

| When | YESTERDAY |
|---|---|
| Who | TARO |
| Where | |
| Action | TURN ON |
| State | |
| Target | HEATER |
| Why | BECAUSE IT IS COLD |
| How | IMMEDIATELY |
| With | |
| Cause | |

FIG. 16

| Ep_id | When | Who | Where | Action | State | Target | Why | How | With | Cause |
|---|---|---|---|---|---|---|---|---|---|---|
| ... | | | | | | | | | | |
| Ep11 | SEPTEMBER 1ST | YAMADA | COMPANY | GO | - | - | - | BY TAXI | - | - |
| Ep12 | SEPTEMBER 2ND | YAMADA | COMPANY | GO | - | - | BECAUSE THEY RAN INTO EACH OTHER | - | WITH SUBORDINATE | - |
| Ep13 | SEPTEMBER 3RD | YAMADA | COMPANY | GO | - | - | - | LATE | - | - |
| ... | | | | | | | | | | |
| Ep20 | - | YAMADA | COMPANY | GO | | | | | | |

D1

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2021/001602 filed on Jan. 19, 2021, which claims priority benefit of Japanese Patent Application No. JP 2020-010576 filed in the Japan Patent Office on Jan. 27, 2020. Each of the above-referenced applications is hereby incorporated herein by reference in its entirety.

TECHNICAL FIELD

The present disclosure relates to an information processing apparatus, an information processing system, and an information processing method.

BACKGROUND ART

In recent years, apparatuses that perform voice recognition of a user utterance and perform interactions based on a recognition result have become widespread. For example, Patent Document 1 discloses a technique for realizing interactions according to a specialized field using a dictionary for each field.

CITATION LIST

Patent Document

Patent Document 1: Japanese Patent Application Laid-Open No. 2003-280683

SUMMARY OF THE INVENTION

Problems to be Solved by the Invention

However, in the conventional art, it is difficult to realize daily interactions because field-specialized interactions recorded in a dictionary for each field is performed. Therefore, in the conventional art, it is desired to realize interactions with which the user has a sense of affinity.

Therefore, the present disclosure proposes an information processing apparatus, an information processing system, and an information processing method capable of realizing interactions with which a user has a sense of affinity.

Solutions to Problems

In order to solve the above problem, an information processing apparatus of an aspect according to the present disclosure includes: an acquisition unit that acquires, from a storage unit that stores episode data of a speaker, the episode data regarding topic information included in utterance data of the speaker; and an interaction control unit that controls an interaction with the speaker so as to include an episode based on the episode data.

Furthermore, an information processing system of an aspect according to the present disclosure is an information processing system including an agent apparatus that collects utterance data of a speaker and an information processing apparatus, the information processing apparatus including: an acquisition unit that acquires, from a storage unit that stores episode data of the speaker, the episode data regarding topic information included in the utterance data; and an interaction control unit that controls an interaction with the speaker so as to include an episode based on the episode data.

Furthermore, an information processing method of an aspect according to the present disclosure includes, by a computer: acquiring, from a storage unit that stores episode data of a speaker, the episode data regarding topic information included in utterance data of the speaker; and controlling an interaction with the speaker so as to include an episode based on the episode data.

BRIEF DESCRIPTION OF DRAWINGS

FIG. 5 is a diagram illustrating an example of episode data according to an embodiment.

FIG. 6 is a diagram illustrating an example of template data according to an embodiment.

FIG. 7 is a diagram for describing an example of generation of episode data based on utterance data according to an embodiment.

FIG. 16 is a diagram for describing generalization of a plurality of pieces of episode data.

MODE FOR CARRYING OUT THE INVENTION

Figure 1:
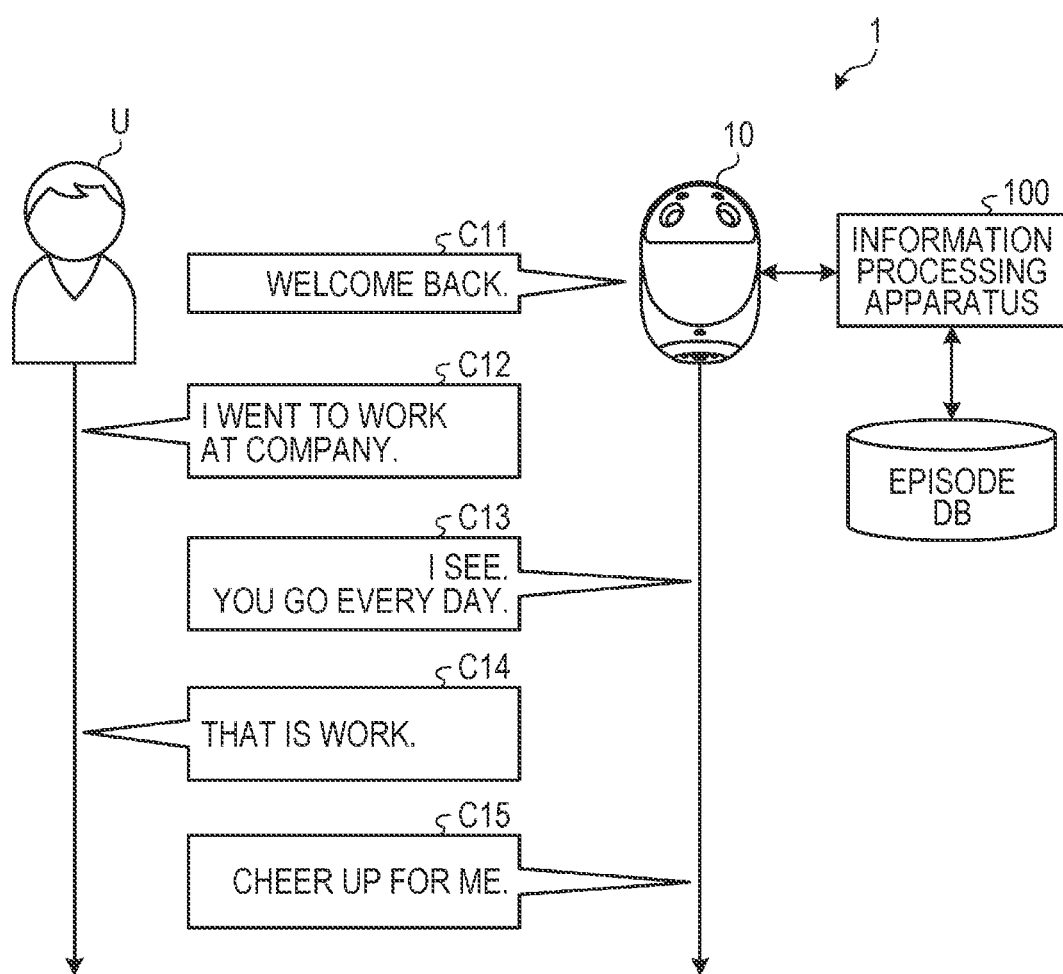
FIG. 1 is a diagram for describing an example of an information processing system according to an embodiment.

Embodiments of the present disclosure will be described in detail below on the basis of the drawings. Note that in each of the embodiments below, the same parts are designated by the same reference numerals and duplicate description will be omitted.

Embodiment

[Outline of the Information Processing System According to the Embodiment]

FIG. 1 is a diagram for describing an example of the information processing system according to the embodiment. An information processing system 1 illustrated in FIG. 1 is an interaction processing system that realizes an interaction between a user U and an agent apparatus 10. The user U is an example of a speaker of the agent apparatus 10 in the information processing system 1. For example, there is a possibility that the user U gets bored if there is no originality or freshness in the interaction with the agent apparatus 10. For example, the user U does not use the agent apparatus 10 with which the user U has gotten bored. Therefore, the information processing system 1 has an episode talk function of realizing an interaction based on an episode of the user U so that the user U does not get bored with the interaction with the agent apparatus 10 and has a sense of affinity.

The information processing system 1 includes the agent apparatus 10 and an information processing apparatus 100. The information processing system 1 may include, for example, a plurality of agent apparatuses 10 that interacts with each of a plurality of users U. The agent apparatus 10 and the information processing apparatus 100 are, for example, configured to be able to communicate via a network or directly communicate without the network. The information processing apparatus 100 may, for example, be incorporated in the agent apparatus 10. In the description described below, an example of the information processing system 1 in which the agent apparatus 10 interacts with the user U by cooperation between the agent apparatus 10 and the information processing apparatus 100 will be described.

The agent apparatus 10 is a so-called Internet of Things (IoT) device, and performs various types of information processing in cooperation with the information processing apparatus 100. There is a case where the voice recognition, the interaction processing by voice, and the like executed by the agent apparatus 10 are referred to as an agent function. For example, the agent apparatus 10 can make various responses to the utterance of the user U. For example, the response includes a response based on episode, a response based on scenario, a response based on the verbalization of situation, a knowledge-based response, a chat response, and the like.

The agent apparatus 10 includes, for example, an autonomous mobile body, a smartphone, a tablet terminal, a game device, a home speaker, a home electrical appliance, an automobile, and the like. The smartphone, the tablet terminal, or the like realizes the agent function described above by executing a program (application) having the agent function. In the present embodiment, a case where the agent apparatus 10 is an autonomous mobile body will be described.

In the example illustrated in FIG. 1, the agent apparatus 10 can be various apparatuses that perform an autonomous operation based on environment recognition. The agent apparatus 10 is a long-ellipsoidal agent-type robot apparatus that autonomously travels by wheels. The agent apparatus 10 includes, for example, two wheels and a drive mechanism for driving the two wheels. The agent apparatus 10 controls the drive mechanism to move while maintaining the upright state. The agent apparatus 10 realizes various communication with the user U, for example, by performing an autonomous operation according to the user U, the surroundings, or the own situation. The agent apparatus 10 may be, for example, a small robot having such a size and weight that the user U can easily lift with one hand.

In the embodiment, the agent apparatus 10 executes information processing with respect to a collected voice. For example, the agent apparatus 10 recognizes an utterance of the user U and executes information processing with respect to the utterance. In the example illustrated in FIG. 1, it is assumed that the agent apparatus 10 is installed at the home, company, school, or the like of the user U who uses the agent apparatus 10.

The agent apparatus 10 may, for example, not only collect surrounding sounds, but include various sensors for acquiring other various types of information. For example, in addition to the microphone, the agent apparatus 10 may include a camera for acquiring a space, an illuminance sensor for detecting illuminance, a gyro sensor for detecting inclination, an infrared sensor for detecting an object, and the like.

The information processing apparatus 100 is a so-called cloud server, and is a server apparatus that executes information processing in cooperation with the agent apparatus 10. The information processing apparatus 100 acquires utterance data of the user U collected by the agent apparatus 10, and analyzes the utterance data using natural language understanding (NLU), natural language processing (NLP), or the like. After extracting the topic information from the utterance data, the information processing apparatus 100 acquires episode data regarding the topic information from an episode database (DB). The topic information includes, for example, information indicating classification of episodes, words such as keywords, character strings, and the like. That is, the topic information is information for acquiring the episode data. The episode DB has, for example, episode data related to the user U and is stored in a storage apparatus. The information processing apparatus 100 has a function of interacting with the user U so as to include an episode based on the episode data.

In the example illustrated in FIG. 1, the agent apparatus 10 utters an utterance C11 instructed by the information processing apparatus 100 in a case where the user U who has been absent is recognized. The utterance C11 is, for example, "Welcome back.". The user U utters an utterance C12 in response to the utterance C11. The utterance C12 is, for example, "I went to work at the company.". The agent apparatus 10 transmits the utterance data of the utterance C12 to the information processing apparatus 100.

The information processing apparatus 100 analyzes the utterance data of the utterance C12 and extracts topic information "company" and "went". The information processing apparatus 100 acquires the episode data corresponding to the extracted topic information from the episode DB, and instructs the agent apparatus 10 to make an utterance C13 based on the episode data. The information processing apparatus 100 acquires, for example, episode data regarding "company" and "go". In this case, the episode data is assumed to be, for example, data indicating an episode regarding that the speaker went to the company yesterday and the day before yesterday. The agent apparatus 10 utters the utterance C13 to the user U. The utterance C13 is, for example, "I see. You go every day.". Note that an interaction method based on the episode data will be described later. The user U utters an utterance C14 in response to the utterance C13. The utterance C14 is, for example, "That is work.". The agent apparatus 10 transmits the utterance data of the utterance C14 to the information processing apparatus 100.

The information processing apparatus 100 analyzes the utterance data of the utterance C14 and controls the agent apparatus 10 to utter a response to the user U. For example, the information processing apparatus 100 generates utterance data suitable for the character of the agent apparatus 10 on the basis of an interaction model, an interaction scenario, or the like for responding to the utterance data. In the example illustrated in FIG. 1, the agent apparatus 10 utters an utterance C15 according to the utterance data of the utterance C14. The utterance C15 is, for example, "Cheer up for me.".

As described above, when acquiring the episode data regarding the topic information included in the utterance data of the user U, the information processing apparatus 100 according to the embodiment can cause the agent apparatus 10 to execute an interaction including an episode of the user U based on the episode data. Therefore, the information processing apparatus 100 can provide the episode based on the episode data of the user U in the interaction with the user U. As a result, the information processing apparatus 100 can realize an interaction with which the user U has a sense of affinity by including the episode of the user U in the interaction.

[Configuration Example of the Agent Apparatus According to the Embodiment]

Figure 2:
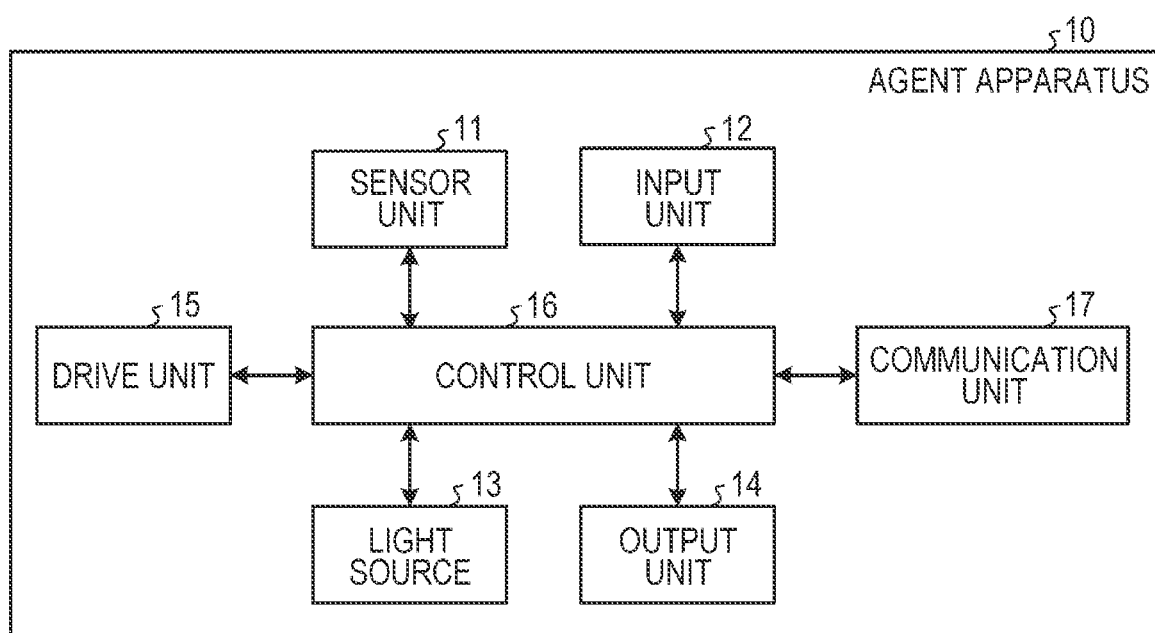
FIG. 2 is a diagram illustrating an example of a configuration of an agent apparatus according to an embodiment.

FIG. 2 is a diagram illustrating an example of a configuration of the agent apparatus 10 according to the embodiment. As illustrated in FIG. 2, the agent apparatus 10 includes a sensor unit 11, an input unit 12, a light source 13, an output unit 14, a drive unit 15, a control unit 16, and a communication unit 17.

The sensor unit 11 has a function of collecting various sensor information regarding the user U and the surroundings. The sensor unit 11 according to the present embodiment includes, for example, a camera, a time of flight (ToF) sensor, a microphone, an inertial sensor, and the like. The sensor unit 11 may include various sensors such as, for example, a geomagnetic sensor, a touch sensor, an infrared sensor, a temperature sensor, and a humidity sensor. The sensor unit 11 supplies the collected sensor information to the control unit 16. The sensor unit 11 has a function of collecting a voice and the like with the microphone. The sensor unit 11 can store the collected voice and the like in a storage apparatus.

The input unit 12 has a function of detecting a physical input operation by the user U. The input unit 12 includes, for example, a button such as a power switch. The input unit 12 supplies input information indicating the detected input operation to the control unit 16.

The light source 13 expresses an eyeball movement of the agent apparatus 10, which is an autonomous mobile body. The light source 13 includes, for example, two eye portions. The light source 13 expresses rich eyeball movement according to the situation and movement in accordance with an instruction from the control unit 16.

The output unit 14 has a function of outputting various sounds including voices. The output unit 14 includes, for example, a speaker, an amplifier, and the like. The output unit 14 outputs a sound instructed by the control unit 16.

The drive unit 15 expresses an operation by driving the drive mechanism of the agent apparatus 10, which is an autonomous mobile body. The drive unit 15 includes, for example, two wheels, a plurality of motors, and the like. The drive unit 15 is driven in accordance with an instruction from the control unit 16.

The control unit 16 controls the agent apparatus 10. The control unit 16 has a function of controlling each configuration included in the agent apparatus 10. The control unit 16 controls, for example, activation and stop of each configuration. The control unit 16 controls the light source 13, the output unit 14, the drive unit 15, and the like on the basis of control information and the like from the information processing apparatus 100.

In a case where an utterance of the user U is collected by the sensor unit 11, the control unit 16 performs control to transmit utterance data indicating the utterance to the information processing apparatus 100. The control unit 16 controls the output unit 14 to output the interaction data instructed from the information processing apparatus 100. The control unit 16 realizes the interaction with the user U by outputting the interaction data for the collected utterance data.

The communication unit 17 communicates with, for example, the information processing apparatus 100, another external apparatus, or the like. The communication unit 17 transmits and receives various data via, for example, a wired or wireless network. For example, in a case where an utterance is collected, the communication unit 17 transmits utterance information to the information processing apparatus 100. For example, the communication unit 17 may transmit not only the utterance data but also identification information for identifying the user U, or the like to the information processing apparatus 100. The communication unit 17 supplies, for example, various data received from the information processing apparatus 100 to the control unit 16.

Figure 3:
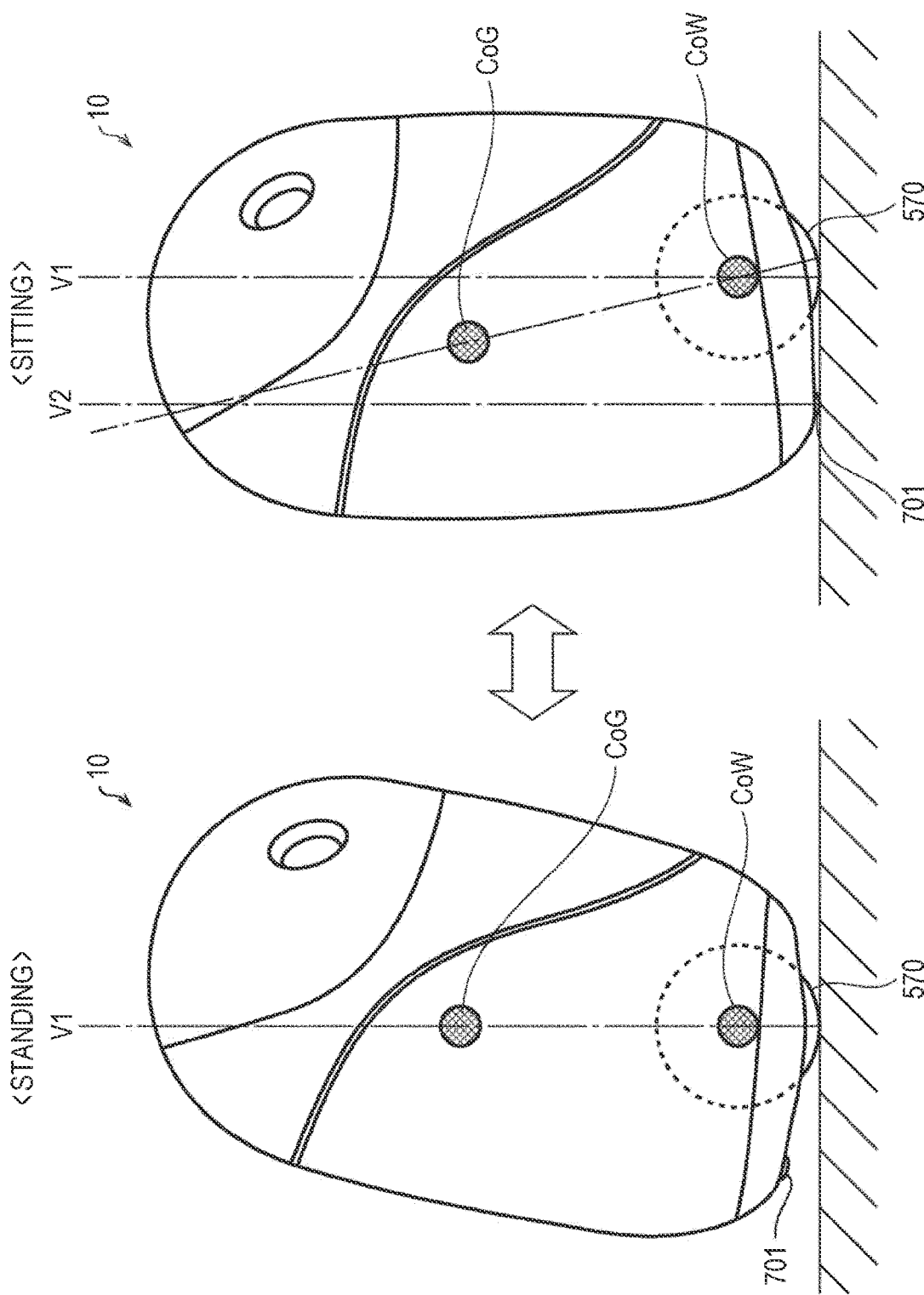
FIG. 3 is a diagram illustrating an example of a structure of the agent apparatus according to the present embodiment.

Heretofore, a functional configuration example of the agent apparatus 10 according to the present embodiment has been described. Note that the aforementioned configurations described in conjunction with FIG. 3 are mere examples, and the functional configuration of the agent apparatus 10 according to the present embodiment is not limited to the above example. The functional configuration of the agent apparatus 10 according to the present embodiment can be flexibly modified depending on the specification or operation.

[Structure Example of the Agent Apparatus According to the Embodiment]

FIG. 3 is a diagram illustrating an example of a structure of the agent apparatus 10 according to the present embodiment. The left diagram in FIG. 3 is a side view diagram illustrating the posture of the agent apparatus 10 in a standing state (including the time of staying and the time of traveling). The right diagram in FIG. 3 is a side view diagram illustrating the posture of the agent apparatus 10 in a sitting state.

As illustrated in the right diagram of FIG. 3, in the present embodiment, the agent apparatus 10 causes a part of the bottom portion to be grounded to the floor surface when resting in the sitting state. Therefore, at least three points including the two wheels 570 and the grounded bottom portion come into contact with the floor surface, and the agent apparatus 10 is in a sitting state at the three points. Therefore, the agent apparatus 10 can stably rest in the sitting state. Furthermore, the agent apparatus 10 does not cause the bottom portion to be set on the floor surface when moving in the standing state.

A center of gravity CoG of the agent apparatus 10 is located on a perpendicular line V1 above the axle of the wheels 570 when the agent apparatus 10 is in a forward tilting posture (standing state) (see the left diagram of FIG. 3). Therefore, the balance of the agent apparatus 10 is kept and the standing state is maintained.

On the other hand, in the sitting state, as illustrated in the right diagram of FIG. 3, by tilting the agent apparatus 10 backward, the at least three points including the two wheels 570 and the bottom portion (protrusion portion 701) are brought into contact with the floor surface. At this time, the center of gravity CoG of the agent apparatus 10 is located between the perpendicular line V1 passing through the axle of the wheels 570 and a perpendicular line V2 passing through a contact portion between the bottom portion (protrusion portion 701) and the floor surface. When the agent apparatus 10 is in the sitting state, the agent apparatus 10 can stably rest in the sitting state by positioning the center of gravity CoG of the agent apparatus 10 between the perpendicular line V1 passing through the axle of the wheels 570 and the perpendicular line V2 passing through the contact portion between the bottom portion (protrusion portion 701) and the floor surface.

[Configuration Example of the Information Processing Apparatus According to the Embodiment]

Figure 4:
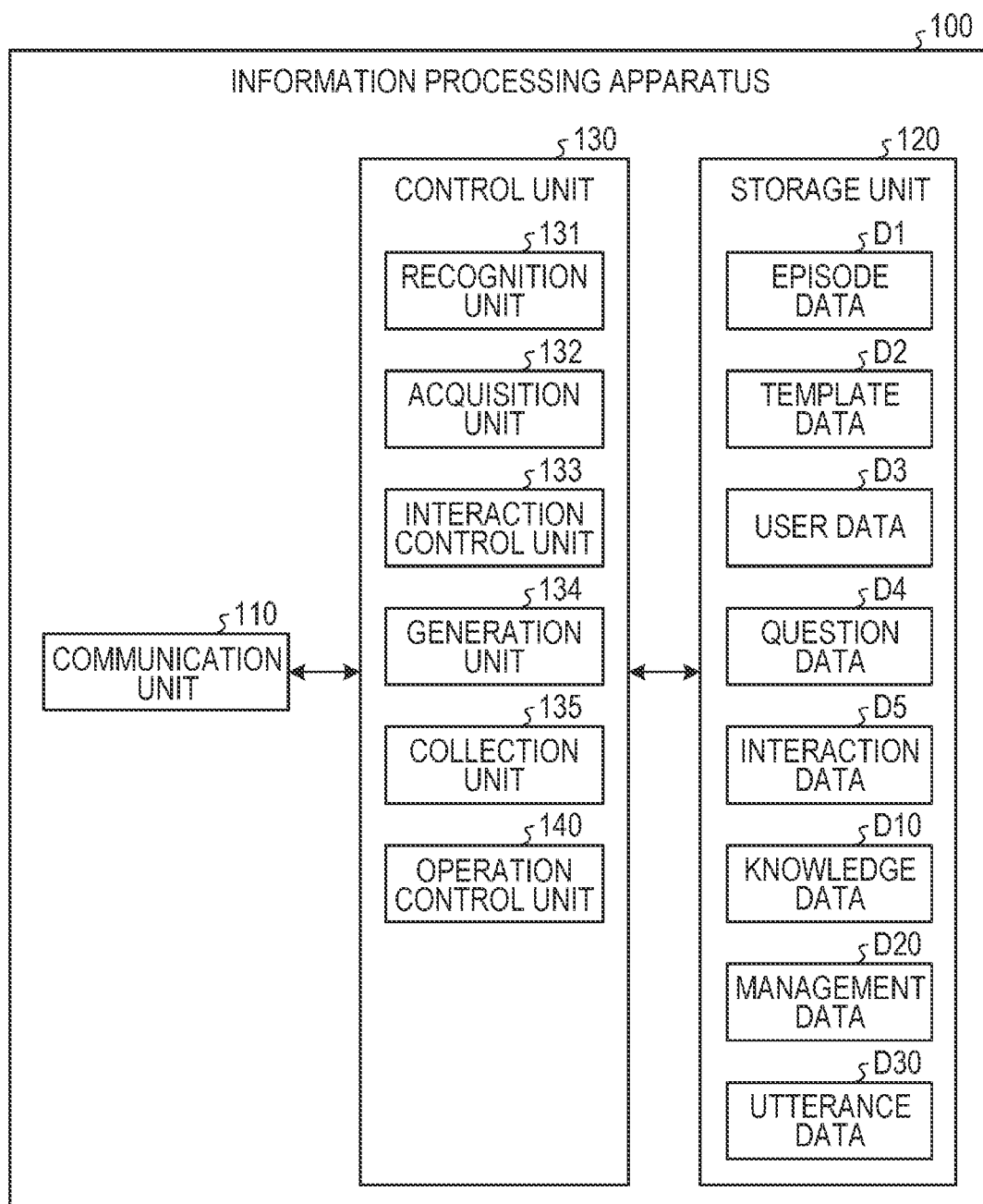
FIG. 4 is a diagram illustrating an example of a configuration of an information processing apparatus according to an embodiment.

FIG. 4 is a diagram illustrating an example of a configuration of the information processing apparatus 100 according to the embodiment. As illustrated in FIG. 4, the information processing apparatus 100 includes a communication unit 110, a storage unit 120, and a control unit 130. The control unit 130 is electrically connected to the communication unit 110 and the storage unit 120.

The communication unit 110 communicates with, for example, the agent apparatus 10, another external apparatus, or the like. The communication unit 110 transmits and receives various data via, for example, a wired or wireless network. The communication unit 110 supplies, for example, data received from the agent apparatus 10 to the control unit 130. For example, the communication unit 110 transmits data instructed by the control unit 130 to an instructed transmission destination.

The storage unit 120 stores various data and programs. For example, the storage unit 120 is, for example, a semiconductor memory element such as random access memory (RAM), flash memory or the like, a hard disk, an optical disk, or the like. The storage unit 120 stores information received via the communication unit 110. The storage unit 120 stores various data such as, for example, episode data D1, template data D2, user data D3, question data D4, interaction data D5, knowledge data D10, management data D20, and utterance data D30.

The episode data D1 is data indicating an episode of the user U. The episode includes, for example, information regarding a past event of the user U, a future schedule of the user U, a hobby of the user U, and the like. The template data D2 is data indicating an algorithm for generating the interaction data D5 from the episode data D1. The user data D3 is data indicating information regarding the user U, and the information regarding the user U includes, for example, personal information, authentication information, setting information, and the like of the user U. The question data D4 is data indicating a question or the like for drawing out an episode from the user U. The question data D4 is data used at the time of generating the episode data D1 or the like. The interaction data D5 is data used for an interaction with the user U. The knowledge data D10 is data for realizing an interaction based on knowledge, a scenario, and the like. The knowledge data D10 includes, for example, information such as intention identification, common sense knowledge, specialized knowledge, and corpus. The management data D20 is data indicating a correspondence relationship between the user U and the agent apparatus 10 used by the user U. The utterance data D30 is utterance data from the agent apparatus 10, and is associated with an analysis result.

In the present embodiment, the information processing apparatus 100 realizes the episode DB by storing and managing the episode data D1 in the storage unit 120. The information processing apparatus 100 may be configured to store the episode DB in a storage apparatus or the like external to the own apparatus.

The control unit 130 is, for example, a dedicated or general-purpose computer. The control unit 130 is, for example, an integrated control unit that controls the information processing apparatus 100. The control unit 130 includes each functional unit that cooperates with the agent apparatus 20 so that the agent apparatus 10 realizes an interaction with the user U.

The control unit 130 includes functional units of a recognition unit 131, an acquisition unit 132, an interaction control unit 133, a generation unit 134, a collection unit 135, and an operation control unit 140. Each functional unit of the control unit 130 is realized by, for example, a central processing unit (CPU), a micro processing unit (MPU), or the like executing a program stored inside the information processing apparatus 100 using the RAM or the like as a work area. Furthermore, each functional unit may be realized by an integrated circuit such as an application specific integrated circuit (ASIC), a field-programmable gate array (FPGA), or the like.

The recognition unit 131 has a function of authenticating the user U on the basis of the sensor information of the agent apparatus 10. The recognition unit 131 performs personal authentication by, for example, face authentication, voice authentication, fingerprint authentication, or the like, and recognizes the user U whom the agent apparatus 10 interacts. In a case where the user U who can use the agent apparatus 10 is authenticated on the basis of the sensor information of the agent apparatus 10, the user data D3, the management data D20, and the like, the recognition unit 131 enables an interaction between the user U and the agent apparatus 10.

The recognition unit 131 converts the utterance data received from the agent apparatus 10 into character strings. For example, the recognition unit 131 can use automatic speech recognition (ASR) processing or the like. The recognition unit 131 analyzes the recognized character strings using NLU, NLP processing, or the like. In the present embodiment, the recognition unit 131 analyzes the dependency structure of the character strings, and stores analysis information indicating the analysis result in the storage unit 120 in association with the utterance data D30. The analysis information includes, for example, information indicating a dependency structure such as a phrase and a case.

The acquisition unit 132 acquires the episode data D1 regarding the topic information included in the utterance data D30 of the user U from the storage unit 120 that stores the episode data D1 of the user U. For example, the acquisition unit 132 extracts the topic information from the utterance data D30. The topic information is information for acquiring an episode of the user U, and includes information such as a preset keyword, word, character string, or the like.

The acquisition unit 132 acquires the episode data D1 in which the topic information satisfies interaction conditions. The interaction conditions are set in, for example, the user data D3, the management data D20, or the like. The interaction conditions include, for example, a condition for extracting the episode data D1 on the basis of the topic information. For example, in a case where the condition is that the set number or more of words or character strings included in the episode data D1 match the topic information, the acquisition unit 132 acquires the episode data D1 satisfying the interaction conditions from the storage unit 120.

In a case where the user U is recognized, the acquisition unit 132 acquires the episode data D1 satisfying acquisition conditions regardless of the utterance of the user U. The acquisition conditions include, for example, conditions for acquiring the episode data D1 indicating the latest episode, an episode of time zone, an episode of date or season of the user U, or the like. The latest episode is, for example, the newest episode of the user U. For example, in a case where the time zone is morning, the episode of time zone includes an episode regarding a schedule of today, an event of yesterday, and the like. For example, in a case where the time zone is daytime, the episode of time zone includes an episode regarding an afternoon schedule, a night schedule, and the like. For example, in a case where the time zone is night, the episode of time zone includes an episode regarding an event of today, a schedule of tomorrow, and the like. The episode of date or season includes, for example, an episode in a set period of time. The acquisition unit 132 supplies the acquired episode data D1 to the interaction control unit 133. In a case where the acquisition unit 132 has failed to acquire the episode data D1, the acquisition unit 132 notifies the interaction control unit 133 of the fact that the acquisition has failed.

The interaction control unit 133 controls an interaction with the user U (speaker) so as to include an episode based on the episode data D1 acquired by the acquisition unit 132. Controlling the interaction includes, for example, controlling to utter an utterance to the user U, controlling to face and talk to the user U, and the like. For example, the interaction control unit 133 controls the agent apparatus 10 to generate the interaction data D5 including an episode and output a voice based on the interaction data D5. The interaction control unit 133 instructs the agent apparatus 10 to output the interaction data D5 by voice via the communication unit 110. Therefore, the agent apparatus 10 realizes an interaction with the user U by outputting the voice based on the interaction data D5 from the output unit 14.

The interaction control unit 133 generates the interaction data D5 including an episode on the basis of, for example, the episode data D1 and an algorithm for generating an interactive sentence. The algorithm can be realized by, for example, a template, an application, a program, or the like. In the present embodiment, a case where the interaction data D5 is generated using the template data D2 will be described.

The interaction control unit 133 generates the interaction data D5 by setting the data of the episode data D1 to the template. The interaction control unit 133 controls an interaction with the user U such that the agent apparatus 10 spontaneously utters an episode. For example, in a case where the user U is recognized, the interaction control unit 133 controls the agent apparatus 10 to utter a voice of the episode based on the episode data D1 satisfying the acquisition condition.

The interaction control unit 133 controls an interaction with the user U on the basis of the interaction data D5 different from the episode in a case where the acquisition unit 132 has not acquired the episode data D1. That is, the interaction control unit 133 controls the agent apparatus 10 to generate the interaction data D5 not including an episode on the basis of the knowledge data D10 and output a voice based on the interaction data D5. The interaction data D5 not including an episode is, for example, data for performing a response based on the knowledge data D10 such as scenario interaction, verbalization of situation, knowledge-based interaction, and a chat response. The scenario interaction includes, for example, a response according to a scenario designed in advance. The verbalization of situation includes, for example, a response based on a corpus, a situation definition, and the like for spontaneous speaking according to the current situation. The knowledge-based interaction includes, for example, a personalized response based on the knowledge data D10. The interaction control unit 133 selects the scenario interaction, the verbalization of situation, the knowledge-based interaction, and the chat response according to the interaction with the user U, and generates the interaction data D5 indicating the selected knowledge-based response.

In a case where the user U of the agent apparatus 10 is authenticated, the interaction control unit 133 controls the interaction with the user U on the basis of the question data D4 in order to draw out an episode of the user U. For example, the interaction control unit 133 can select the question data D4 according to the time zone. The interaction control unit 133 controls the agent apparatus 10 so as to output a voice based on the question data D4.

The generation unit 134 generates the episode data D1 on the basis of the analysis result of the utterance data D30. For example, the generation unit 134 generates the episode data D1 on the basis of the analysis result of the utterance data D30 and the state and situation of the agent apparatus 10. The generation unit 134 focuses on the state and situation of the agent apparatus 10 to generate the episode data D1 on the basis of information that cannot be recognized from the analysis result of the utterance data D30.

The generation unit 134 generates the episode data D1 on the basis of the question data D4 that the interaction control unit 133 is asking the user U and the analysis result of the utterance data D30 corresponding to the question. For example, the generation unit 134 generates the episode data D1 by combining the question content of the question data D4 and the answer of the user U. For example, in the case of the question data D4 "Where are you going today?", the generation unit 134 can generate the episode data D1 indicating today's episode of the user on the basis of the response to the question of the user U. That is, the generation unit 134 can generate the episode data D1 on the basis of the response drawn out from the user U by the question. The generation unit 134 stores the generated episode data D1 in the storage unit 120 in association with the user U.

The collection unit 135 collects related information regarding the recognized user U. The related information includes, for example, information indicating a past situation or the like of the user U. The collection unit 135 collects, for example, information indicating a situation of the user U recognized on the basis of the sensor information of the agent apparatus 10. The collection unit 135 collects, for example, related information indicating "Mr. Suzuki came to our home yesterday". The collection unit 135 collects, for example, related information indicating "Mother was watching TV on the weekend". The collection unit 135 can collect, for example, the schedule of the user U, information of the user U on a social network, and the like as the related information. The collection unit 135 supplies the collected related information to the generation unit 134.

The generation unit 134 generates the episode data D1 of the user U on the basis of the collected related information and stores the episode data D1 in the storage unit 120. For example, the generation unit 134 analyzes the related information and generates the episode data D1 on the basis of information of a person, an animal, or the like related to the user U.

The operation control unit 140 controls the operation of the agent apparatus 10. The operation control unit 140 controls the operation of the agent apparatus 10 on the basis of, for example, an action plan based on the situation of the user U, learning knowledge, or the like. For example, the operation control unit 140 performs control to move and operate the agent apparatus 10 having a long ellipsoidal outer shape while maintaining the standing state. The movement operation includes, for example, a forward and back motion, a turning motion, a rotation motion, and the like. The operation control unit 140 performs control to cause the agent apparatus 10 to actively execute an inducement operation that induces communication between the user U and the agent apparatus 10. The inducement operation includes, for example, an action for inducing an interaction between the user U and the agent apparatus 10.

Heretofore, a functional configuration example of the information processing apparatus 100 according to the embodiment has been described. Note that the aforementioned configuration described in conjunction with FIG. 4 is a mere example, and the functional configuration of the information processing apparatus 100 according to the embodiment is not limited to the above example. The functional configuration of the information processing apparatus 100 according to the embodiment can be flexibly modified depending on the specification or operation.

[Data Structure Example of the Episode Data]

FIG. 5 is a diagram illustrating an example of the episode data D1 according to the embodiment. As illustrated in FIG. 5, the information processing apparatus 100 has a plurality of pieces of episode data D1 regarding the user U. In the example illustrated in FIG. 5, a case of having six pieces of episode data D1 will be described, but the number of pieces of episode data D1 varies depending on the number of created and registered pieces of episode data. The episode data D1 includes, for example, items such as Ep_id, When, Who, Where, Action, State, Target, Why, How, With, Cause, and the like.

In the item Ep_id, information with which it is possible to identify the episode data D1 of the user U is set. In the item When, information regarding date and time, season, and the like of the episode data D1 is set. In the item Who, information regarding a name, a proper noun, and the like of the episode data D1 is set. In the item Where, information regarding the location of the episode data D1 is set. In the item Action, information regarding a predicate of the episode data D1 is set. In the item State, information regarding the state of the episode data D1 is set. In the item Target and in the item Why, information regarding the cause of the episode data D1 is set. In the item How, information regarding a means, a method, a procedure, and the like of the episode data D1 is set. In the item With, information regarding a person, an animal, an object, and the like of the episode data D1 is set. In the item Cause, information regarding the cause of the episode data D1 is set. That is, in the item Cause, information for associating the pieces of episode data D1 with each other is set. In the episode data D1, information is set to an item corresponding to an episode among a plurality of items, and an item not corresponding to the episode is blank.

In the example illustrated in FIG. 5, the information processing apparatus 100 manages six pieces of episode data D1 of Ep1 to Ep6 as the episode data D1 regarding the user U. The episode data D1 of the item Ep_id being Ep1 is data indicating an episode "Tanaka pats the aibo at home yesterday". The episode data D1 of Ep1 indicates that it is the cause of the episode data D1 of Ep2 because "Ep2" is set in the item Cause. The episode data D1 of the item Ep_id being Ep2 is data indicating an episode "The aibo is happy at home yesterday". That is, the episode data D1 of Ep1 and EP2 indicate the episodes that the Aibo was happy because Tanaka patted the aibo at home yesterday. The episode data D1 of the item Ep_id being Ep3 is data indicating an episode "Because Tanaka is hungry this morning, Tanaka eats curry quickly with Yamada". The episode data D1 of Ep3 indicates that it is not related to any other episode data D1 because the item Cause is blank.

The episode data D1 of the item Ep_id being Ep4 is data indicating an episode "Recently, Yamada runs and makes a dash for a toilet". The episode data D1 of Ep4 indicates that it is the cause of the episode data D1 of Ep5 because "Ep5" is set in the item Cause. The episode data D1 of the item Ep_id being Ep5 is data indicating an episode "Yamada falls down". That is, the episode data D1 of Ep4 and EP5 indicate the episodes that Yamada made a dash for a toilet and fell down. The episode data D1 of the item Ep_id being Ep6 is data indicating a future episode "Tomorrow, everyone will get into a hot spring in Izu". The episode data D1 of Ep6 indicates that it is not related to any other episode data D1 because the item Cause is blank.

In the present embodiment, a case where information such as yesterday, this morning, or the like is set to the item When of the episode data D1 will be described in order to simplify the description, but date and time information may be set. In this case, it is sufficient if the information processing apparatus 100 replaces the date and time with yesterday, the day before yesterday, tomorrow, or the like when creating the interaction data D5 on the basis of the episode data D1.

The aforementioned configuration described in conjunction with FIG. 5 is a mere example, and the data structure of the episode data D1 according to the embodiment is not limited to the above example. The data structure of the episode data D1 according to the embodiment can be flexibly modified depending on the specification or operation. For example, the episode data D1 may have items such as a purpose, a destination, and the like regarding the episode.

[Data Structure Example of the Template Data]

FIG. 6 is a diagram illustrating an example of the template data D2 according to the embodiment. As illustrated in FIG. 6, the template data D2 includes, for example, items such as a classification, a template, or the like. The classification includes, for example, classification of episodes such as past, future, during conversation (currently recognizing), and the like. The template has data for performing an interaction based on the items of the episode data D1. The template is an example of an algorithm. In the present embodiment, a case where the information processing apparatus 100 generates the interaction data D5 using a template will be described, but the information processing apparatus 100 may generate the interaction data D5 using an application, a module, or the like for executing an algorithm.

In the example illustrated in FIG. 6, the template data D2 of the classification being past (1) indicates an algorithm
"(when) (who) (where+de) (why+kara) (with)to(target) (how) (action+ta) yone". The template data D2 of the classification being past (2) indicates an algorithm
"(when) (who) (where+de) (why+kara) (with)to(target) (how) (action+te) (state+ta)yone". The template data D2 of the classification being future indicates an algorithm "(when) (who) (where+de) (why+kara) (with)to(target) (how) (action end-form)ndesho". The template data D2 of the classification being during conversation indicates an algorithm "(when) (who) (where+de) (why+kara) (with)to(target) (how) (action end-form)ne".

The information processing apparatus 100 generates the interaction data D5 indicating an episode by setting the information of the item set in the episode data D1 to the corresponding item of the algorithm of the template data D2. For example, in the case of the episode data D1 of Ep1 illustrated in FIG. 5, the information processing apparatus 100 generates the interaction data D5 of "Tanaka patted the aibo at home yesterday" using the template data D2 of the past. The information processing apparatus 100 stores the template data D2 corresponding to the character of the agent apparatus 10 in the storage unit 120 to enable an interaction of an episode suitable for the character. The information processing apparatus 100 stores the template data D2 according to the language or the like of the region where the user U lives in the storage unit 120 to enable an interaction of an episode with a sense of affinity.

[Example of Generation of the Episode Data]

Figure 8:
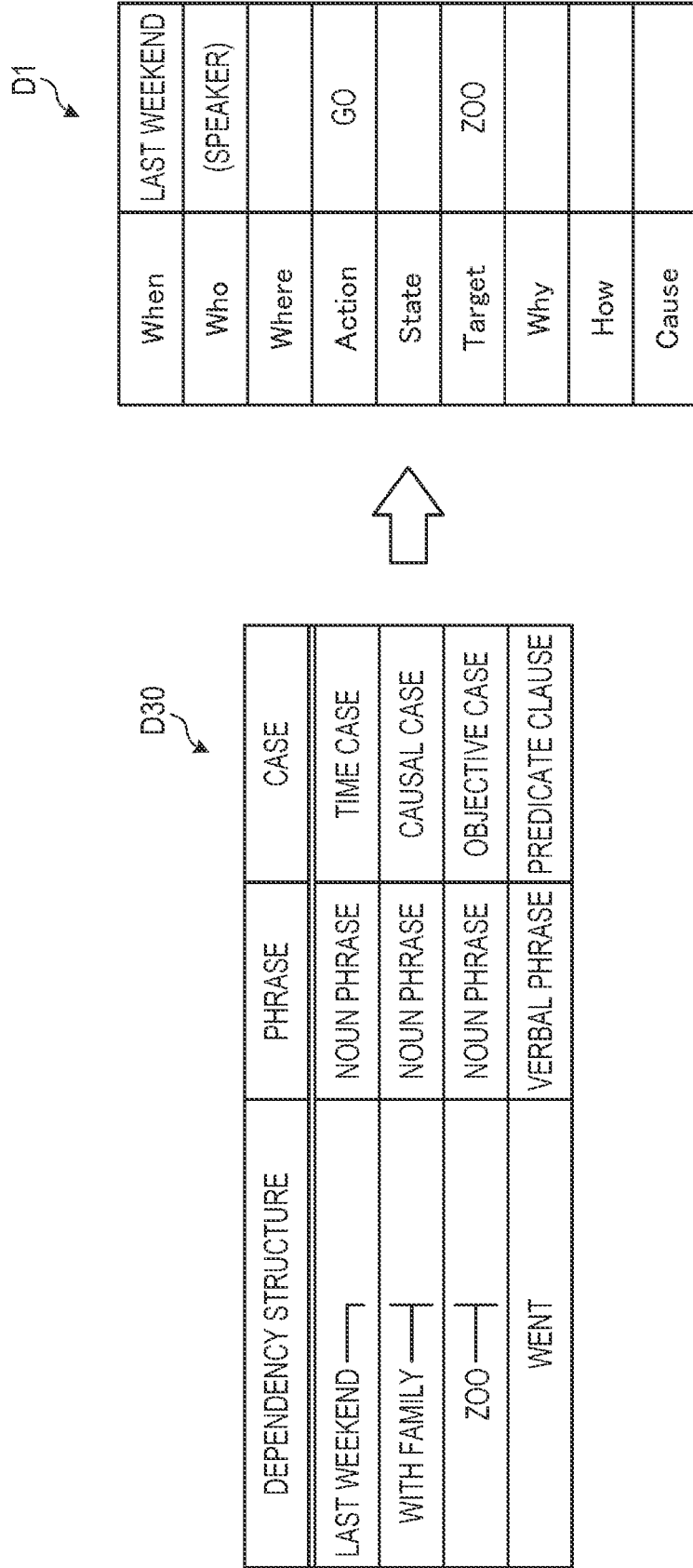
FIG. 8 is a diagram for describing an example of generation of episode data based on utterance data according to an embodiment.

FIGS. 7 and 8 are diagrams for describing an example of generation of the episode data D1 based on the utterance data D30 according to the embodiment.

In the example illustrated in the left diagram of FIG. 7, the dependency structure of "yesterday", "Taro", "at home", "because it was cold", "heater", "immediately", and "turned on" in the utterance data 30 is analyzed by syntactic analysis. Regarding "yesterday", the phrase is a noun phrase, and the case is a time case. Regarding "Taro", the phrase is a noun phrase, and the case is a nominative case. Regarding "at home", the phrase is a noun phrase, and the case is a causal case. Regarding "because it was cold", the phrase is an adjective phrase, and the case is a modifier clause of an inflectable word. Regarding "heater", the phrase is a noun phrase, and the case is an objective case. Regarding "immediately", the phrase is an adverbial phrase, and the case is a modifier clause of an inflectable word. Regarding "turned on", the phrase is a verbal phrase and the case is a predicate clause. In this case, the information processing apparatus 100 generates the episode data D1 illustrated in the right diagram of FIG. 7 on the basis of the analysis result of the utterance data D30, and stores the episode data D1 in the storage unit 120 as the episode data D1 of the user U. In the episode data D1, "yesterday" is set to the item When, "Taro" is set to the item Who, "turn on" is set to the item Action, "heater" is set to the item Target, "because it is cold" is set to the item Why, and "immediately" is set to the item How, and the other items are blank.

In the example illustrated in the left diagram of FIG. 8, the dependency structure of "last weekend", "with family", "zoo", and "went" in the utterance data D30 is analyzed by syntactic analysis. Regarding "last weekend", the phrase is a noun phrase, and the case is a time case. Regarding "with family", the phrase is a noun phrase, and the case is a causal case. Regarding "zoo", the phrase is a noun phrase, and the case is an objective case. Regarding "went", the phrase is a verbal phrase and the case is a predicate clause. In this case, the information processing apparatus 100 generates the episode data D1 illustrated in the right diagram of FIG. 8 on the basis of the analysis result of the utterance data D30, and stores the episode data D1 in the storage unit 120 as the episode data D1 of the user U. In the episode data D1, "last weekend" is set to the item When, "speaker" is set to the item Who, "go" is set to the item Action, and "zoo" is set to the item Target, and the other items are blank. In a case where the nominative case is not included in the utterance data D30, the speaker of the agent apparatus 10 is set to the item Who of the episode data D1.

[Processing Procedure Example (1) of the Information Processing Apparatus According to the Embodiment]

Figure 9:
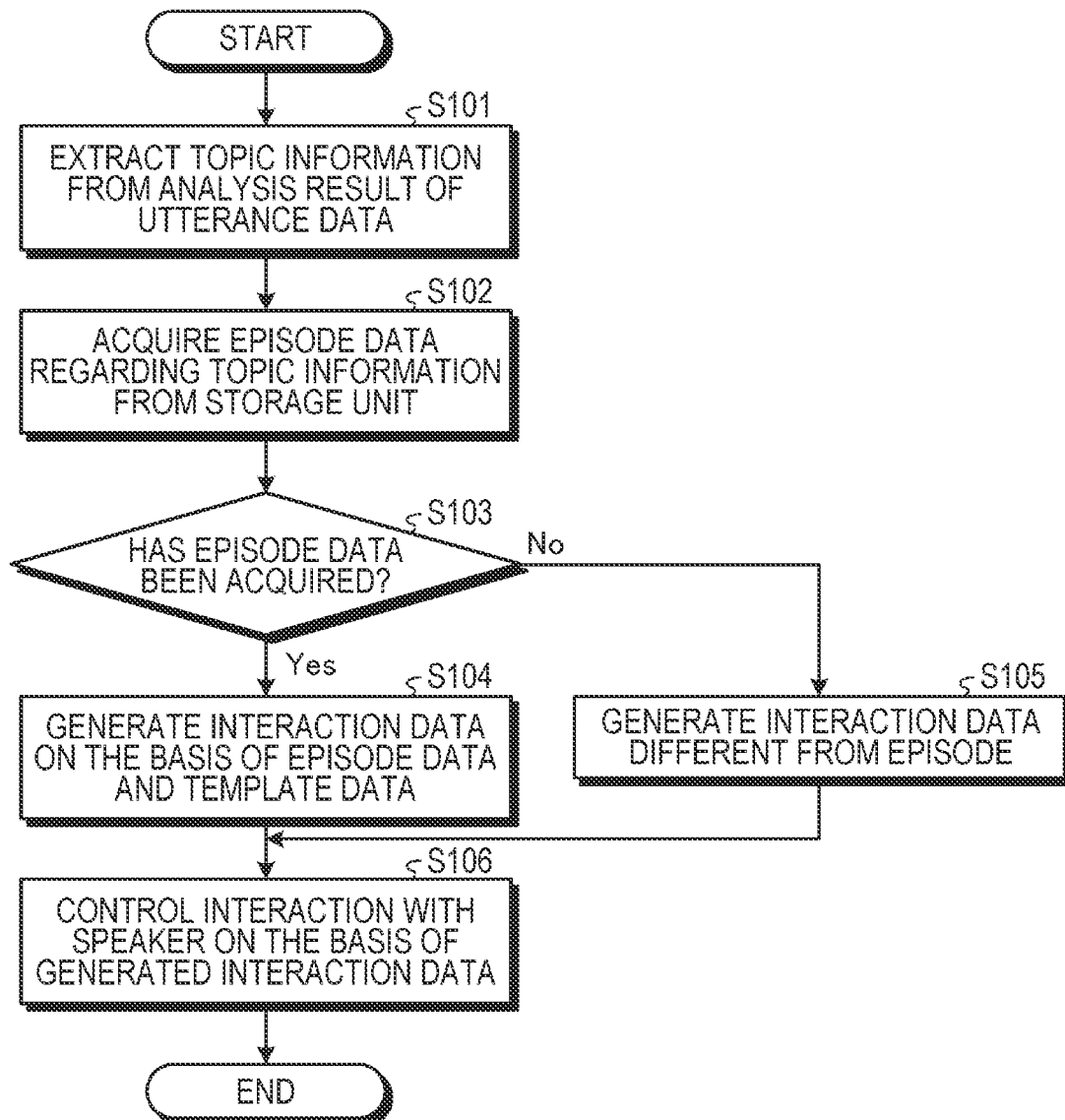
FIG. 9 is a flowchart illustrating processing procedure example (1) of an information processing apparatus according to an embodiment.

FIG. 9 is a flowchart illustrating processing procedure example (1) of the information processing apparatus 100 according to the embodiment. The processing procedure illustrated in FIG. 9 is realized by the control unit 130 of the information processing apparatus 100 executing a program. The processing procedure illustrated in FIG. 9 is repeatedly executed in a case where the interaction of the agent apparatus 10 is controlled by the information processing apparatus 100. That is, the processing procedure illustrated in FIG. 9 is repeatedly executed by the information processing apparatus 100, for example, during the interaction with the user U.

As illustrated in FIG. 9, the control unit 130 of the information processing apparatus 100 extracts topic information from the analysis result of the utterance data D30 (step S101). For example, the control unit 130 extracts, as the topic information, a word, a character string, or the like that satisfies extraction conditions such as when, where, who, what is done, in what state, to what, what, with whom, why, how, a purpose, and a result thereof. After storing the extraction result in the storage unit 120, the control unit 130 proceeds the processing to step S102.

The control unit 130 acquires the episode data D1 regarding the topic information from the storage unit 120 (step S102). For example, the control unit 130 searches for the episode data D1 having the topic information and acquires the episode data D1 satisfying the interaction condition from the storage unit 120. The interaction condition includes, for example, that the number, ratio, and the like of matching between the words included in the episode data D1 and the topic information are greater than or equal to a preset threshold value. In a case where the plurality of pieces of episode data D1 is acquired, the control unit 130 uses the episode data D1 having the highest degree of matching or uses the episode data D1 not used in the past interaction. After storing the acquisition result indicating whether or not the episode data D1 has been acquired in the storage unit 120, the control unit 130 proceeds the processing to step S103.

The control unit 130 determines whether or not the episode data D1 has been acquired on the basis of the acquisition result of the storage unit 120 (step S103). In a case where it is determined that the episode data D1 has been acquired (Yes in step S103), the control unit 130 proceeds the processing to step S104. The control unit 130 generates the interaction data D5 on the basis of the episode data D1 and the template data D2 (step S104). For example, the control unit 130 acquires the template data D2 of the classification corresponding to the information of the item when of the episode data D1 from the storage unit 120. In a case where the item when indicates the past, the control unit 130 acquires the template data D2 of the classification being the past. The control unit 130 generates the interaction data D5 by setting the information set in the item of the episode data D1 to the template of the acquired template data D2. After storing the generated interaction data D5 in the storage unit 120, the control unit 130 proceeds the processing to step S106 described later.

Furthermore, in a case where it is determined that the episode data D1 has not been acquired (No in step S103), the control unit 130 proceeds the processing to step S105. The control unit 130 generates the interaction data D5 different from the episode (step S105). For example, the control unit 130 selects one of the scenario interaction, the verbalization of situation, the knowledge-based interaction, and the chat on the basis of the history of previous interactions with the user U, and generates the interaction data D5. In a case where the scenario interaction is selected, the control unit 130 generates the interaction data D5 based on the scenario corresponding to the utterance content of the user U. In a case where the verbalization of situation is selected, the control unit 130 generates the interaction data D5 corresponding to the current situation recognized via the agent apparatus 10. In a case where the knowledge-based interaction is selected, the control unit 130 generates the interaction data D5 based on the utterance content of the user U and the knowledge data D10. In a case where the chat is selected, the control unit 130 generates the interaction data D5 responding to the utterance content of the user U. After storing the generated interaction data D5 in the storage unit 120, the control unit 130 proceeds the processing to step S106.

The control unit 130 controls the interaction with the speaker on the basis of the generated interaction data D5 (step S106). For example, the control unit 130 instructs the agent apparatus 10 to perform an interaction based on the interaction data D5 via the communication unit 110. Therefore, the agent apparatus 10 realizes an interaction with the user U by making an utterance based on the instructed interaction data D5. When the processing of step S106 ends, the control unit 130 ends the processing procedure illustrated in FIG. 9.

In the processing procedure illustrated in FIG. 9, the control unit 130 functions as the acquisition unit 132 by executing step S102. The control unit 130 functions as the interaction control unit 133 by executing the processing from step S103 to step S106.

As described above, when acquiring the episode data D1 regarding the topic information included in the utterance data D30 of the user U, the information processing apparatus 100 can realize an interaction including the episode of the speaker based on the episode data D1. The information processing apparatus 100 can provide the episode based on the episode data D1 of the user U in the interaction with the user U. As a result, the information processing apparatus 100 can realize an interaction with which the user U has a sense of affinity by including the episode of the user U in the interaction.

[Processing Procedure Example (2) of the Information Processing Apparatus According to the Embodiment]

Figures 10, 11:
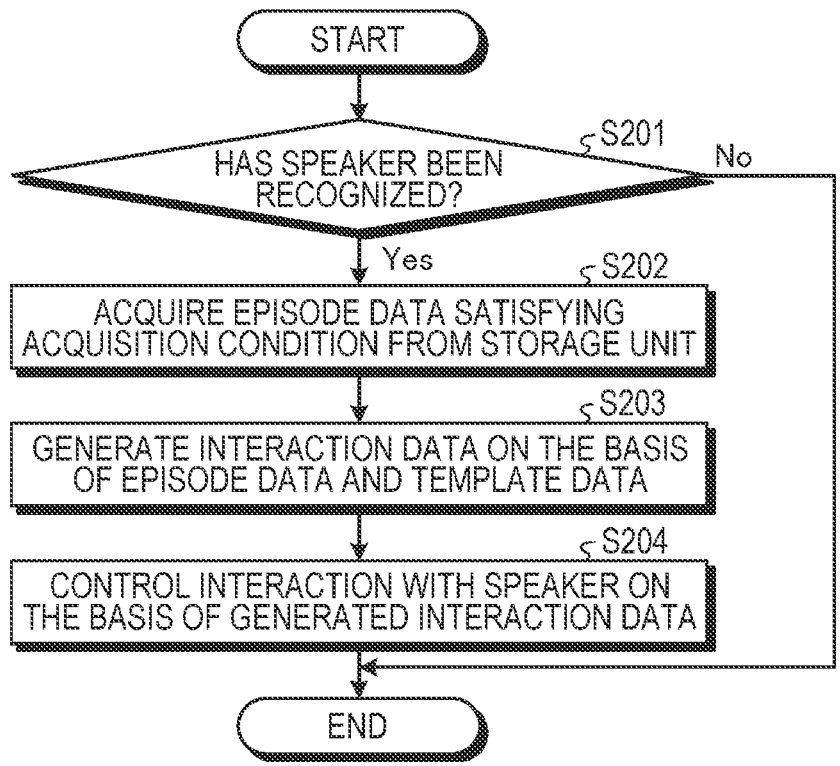
FIG. 10 is a flowchart illustrating processing procedure example (2) of an information processing apparatus according to an embodiment.
FIG. 11 is a diagram illustrating an example of question data according to an embodiment.

FIG. 10 is a flowchart illustrating processing procedure example (2) of the information processing apparatus 100 according to the embodiment. The processing procedure illustrated in FIG. 10 is realized by the control unit 130 of the information processing apparatus 100 executing a program. The processing procedure illustrated in FIG. 10 is executed by the information processing apparatus 100 in order to spontaneously interact with the user U in a case where the user U (speaker) of the agent apparatus 10 is recognized and the interaction with the user U is not performed.

As illustrated in FIG. 10, the control unit 130 of the information processing apparatus 100 determines whether or not the speaker of the agent apparatus 10 has been recognized (step S201). For example, the control unit 130 acquires the sensor information of the agent apparatus 10 via the communication unit 110, and performs processing of recognizing the face, voiceprint, and the like of the speaker on the basis of the sensor information and the user data D3 associated with the agent apparatus 10. In a case where it is determined that the speaker is not recognized on the basis of the result of the recognition processing (No in step S201), the control unit 130 ends the processing procedure illustrated in FIG. 10.

In a case where it is determined that the speaker is recognized on the basis of the result of the recognition processing (Yes in step S201), the control unit 130 proceeds the processing to step S202. The control unit 130 acquires the episode data D1 satisfying the acquisition condition from the storage unit 120 (step S202). The acquisition condition includes, for example, a condition for acquiring the latest episode of the speaker, an episode according to a time zone, or the like. For example, in a case where the acquisition condition is a condition for acquiring the latest episode, the control unit 130 acquires the newest episode data D1 from the storage unit 120 from the storage unit 120. For example, in a case where the acquisition condition is a condition for acquiring an episode according to a time zone, the control unit 130 refers to the item When of the episode data D1 and the like, and acquires the episode data D1 suitable for the time zone from the storage unit 120. For example, in a case where the time zone is morning, the control unit 130 acquires the episode data D1 indicating a schedule of today, an event of yesterday, and the like from the storage unit 120. For example, in a case where the time zone is daytime, the control unit 130 acquires the episode data D1 indicating a schedule of afternoon, a schedule of night, and the like from the storage unit 120. For example, in a case where the time zone is night, the control unit 130 acquires the episode data D1 indicating an event of today, a schedule of tomorrow, and the like from the storage unit 120. When the processing of step S202 ends, the control unit 130 proceeds the processing to step S203.

The control unit 130 generates the interaction data D5 on the basis of the episode data D1 and the template data D2 (step S203). For example, the control unit 130 acquires the template data D2 of the classification corresponding to the information of the item when of the episode data D1 from the storage unit 120. The control unit 130 generates the interaction data D5 for the agent apparatus 10 to spontaneously make an utterance by setting the information set in the item of the episode data D1 to the template of the acquired template data D2. After storing the generated interaction data D5 in the storage unit 120, the control unit 130 proceeds the processing to step S204.

The control unit 130 controls the interaction with the speaker on the basis of the generated interaction data D5 (step S204). For example, the control unit 130 instructs the agent apparatus 10 to perform an interaction based on the interaction data D5 via the communication unit 110. Therefore, the agent apparatus 10 spontaneously performs an interaction with the user U by making an utterance based on the instructed interaction data D5. When the processing of step S204 ends, the control unit 130 ends the processing procedure illustrated in FIG. 10.

In the processing procedure illustrated in FIG. 10, the control unit 130 functions as the acquisition unit 132 by executing step S202. The control unit 130 functions as the interaction control unit 133 by executing the processing from step S203 to step S204.

As described above, the information processing apparatus 100 can acquire the episode data D1 satisfying the acquisition condition regardless of the utterance data D30 of the speaker and spontaneously provide the episode based on the episode data D1. Furthermore, since the information processing apparatus 100 can acquire various episode data D1 depending on the acquisition condition, it is possible to spontaneously provide various episodes. As a result, since the information processing apparatus 100 can provide the episode of the user U even in a state of not interacting with the user U, it is possible to give the user U a sense of affinity.
[Data Structure Example of the Question Data]

FIG. 11 is a diagram illustrating an example of the question data D4 according to the embodiment. As illustrated in FIG. 11, the question data D4 includes items such as, for example, time zone, question content, or the like. The time zone is, for example, a time zone in which a question is made, such as morning, daytime, or night. The question content includes data for asking a question according to the time zone.

In the example illustrated in FIG. 11, the question data D4 of the time zone being morning has question contents such as "Where are you going today?", "What's your plan for today?", "What do you do today?", "What did you do yesterday?", "Where did you go yesterday?", and the like. The question data D4 of the time zone being daytime has question contents such as "What do you eat at night?", "What are you doing this afternoon?", and the like. The question data D4 of the time zone being night has question contents such as "What will you do tomorrow?", "What did you do today?", and the like.

[Processing Procedure of the Information Processing Apparatus Regarding Generation of the Episode Data Using Question]

Figure 12:
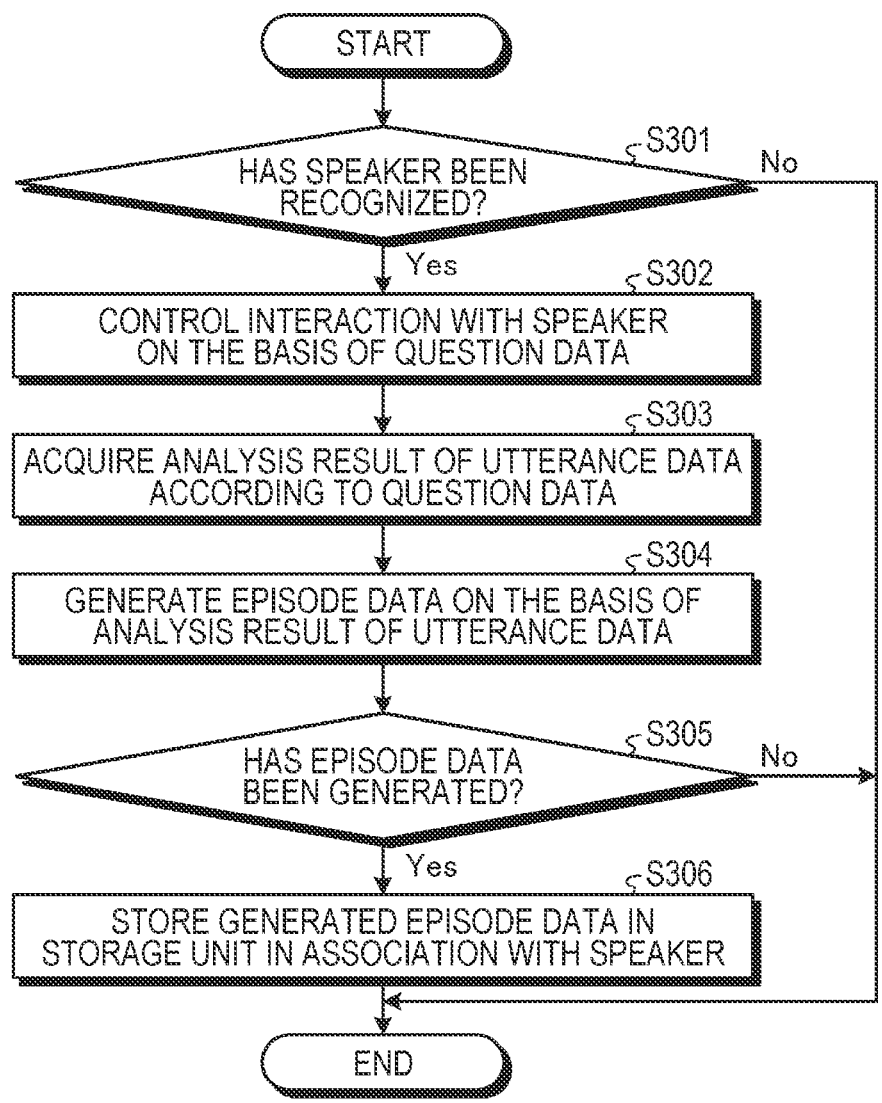
FIG. 12 is a flowchart illustrating a processing procedure of the information processing apparatus regarding generation of episode data using a question.

FIG. 12 is a flowchart illustrating a processing procedure of the information processing apparatus 100 regarding generation of the episode data using a question. The processing procedure illustrated in FIG. 12 is realized by the control unit 130 of the information processing apparatus 100 executing a program. The processing procedure illustrated in FIG. 12 is executed by the information processing apparatus 100 in a case where the user U (speaker) of the agent apparatus 10 is recognized.

As illustrated in FIG. 12, the control unit 130 of the information processing apparatus 100 determines whether or not the speaker of the agent apparatus 10 has been recognized (step S301). In a case where it is determined that the speaker is not recognized (No in step S301), the control unit 130 ends the processing procedure illustrated in FIG. 12. Furthermore, in a case where it is determined that the speaker is recognized (Yes in step S301), the control unit 130 proceeds the processing to step S302.

The control unit 130 controls the interaction with the speaker on the basis of the question data D4 (step S302). For example, the control unit 130 acquires the question data D4 corresponding to the current time zone from the storage unit 120, and instructs the agent apparatus 10 to perform an interaction based on the question data via the communication unit 110. Therefore, the agent apparatus 10 utters a question sentence to the user U by making an utterance based on the instructed interaction data D5. When the processing of step S302 ends, the control unit 130 proceeds the processing to step S303.

The control unit 130 acquires an analysis result of the utterance data D30 corresponding to the question data D4 (step S303). For example, the control unit 130 acquires an analysis result of the utterance data D30 after instructing the interaction based on the question data D4. After acquiring the analysis result of the utterance data D30, the control unit 130 proceeds the processing to step S304.

The control unit 130 generates the episode data D1 on the basis of the analysis result of the utterance data D30 (step S304). For example, the control unit 130 generates the episode data D1 on the basis of the analysis result of the utterance data D30 as illustrated in FIGS. 7 and 8. For example, in a case where the analysis result of the utterance data D30 includes information regarding an episode, the control unit 130 generates the episode data D1. For example, in a case where the analysis result of the utterance data D30 does not include information for generating an episode, the control unit 130 does not generate the episode data D1. The information for generating an episode includes, for example, information corresponding to the items such as Action, When, and the like. Returning to FIG. 12, the control unit 130 functions as the generation unit 134 by executing step S304. When the processing of step S304 ends, the control unit 130 proceeds the processing to step S305.

The control unit 130 determines whether or not the episode data D1 has been generated in step S304 (step S305). In a case where it is determined that the episode data D1 is not generated (No in step S305), the control unit 130 ends the processing procedure illustrated in FIG. 12. Furthermore, in a case where it is determined that the episode data D1 has been generated (Yes in step S305), the control unit 130 proceeds the processing to step S306. The control unit 130 stores the generated episode data D1 in the storage unit 120 in association with the speaker (step S306). For example, the control unit 130 stores the episode data D1 in the storage unit 120 in association with the user data D3 of the recognized speaker. When the processing of step S306 ends, the control unit 130 ends the processing procedure illustrated in FIG. 12.

[Example of Generation of the Episode Data Using Question]

Figure 13:
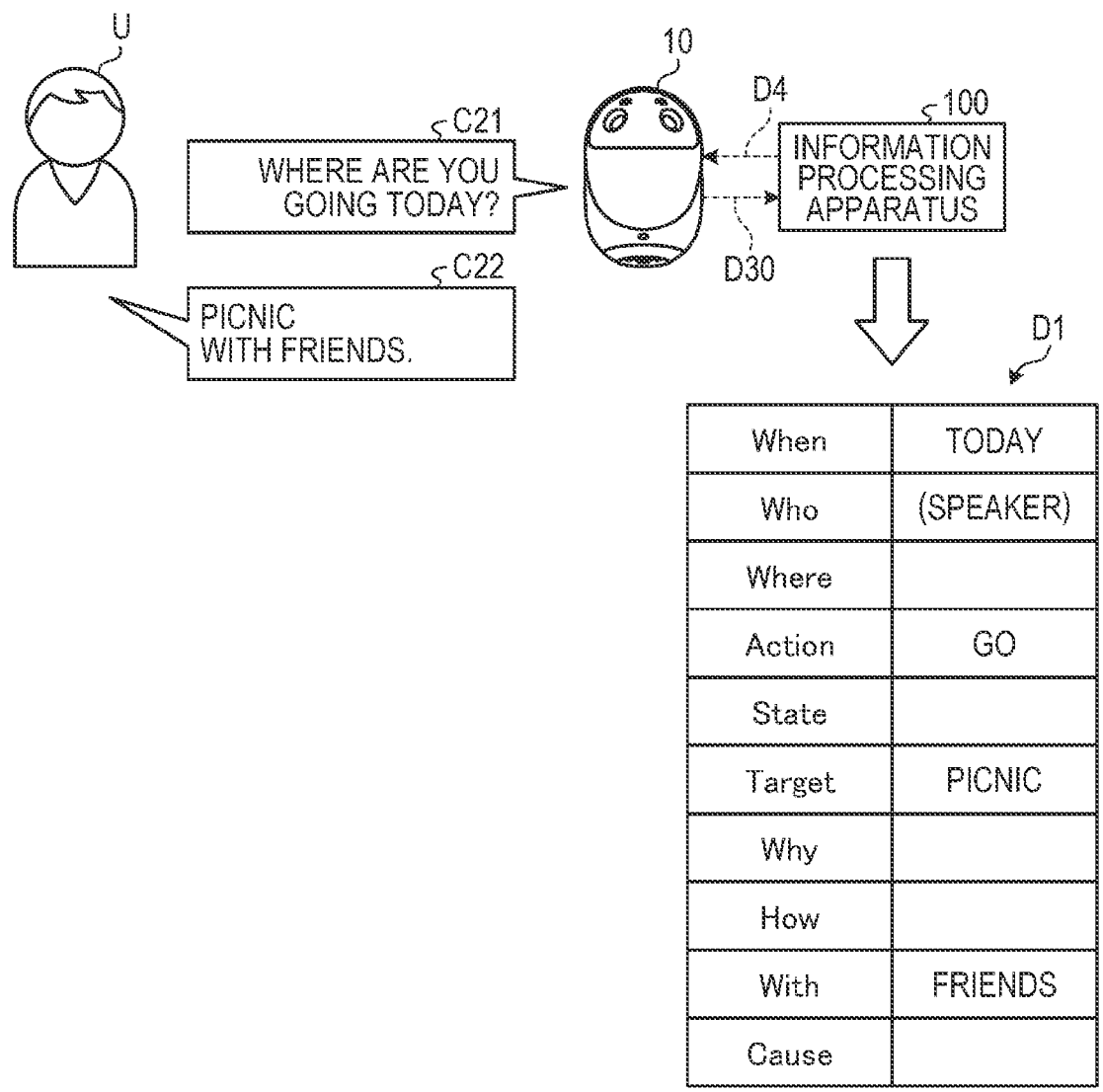
FIG. 13 is a diagram illustrating an example of generation of episode data using a question of the information processing apparatus according to an embodiment.

FIG. 13 is a diagram illustrating an example of generation of the episode data using a question of the information processing apparatus 100 according to the embodiment.

In the example illustrated in FIG. 13, the agent apparatus 10 utters an utterance C21 instructed by the information processing apparatus 100 and based on the question data D4 when the user U is recognized. The utterance C21 is, for example, "Where are you going today?". The user U utters an utterance C22 in response to the utterance C21. The utterance C22 is, for example, "A picnic with friends.". The agent apparatus 10 transmits the utterance data of the utterance C22 to the information processing apparatus 100.

The information processing apparatus 100 analyzes the utterance data D30 of the utterance C22 and extracts topic information "friends" and "picnic". Furthermore, the question sentence of the utterance C21 includes topic information of "today" and "go". In this case, the information processing apparatus 100 generates the episode data D1 illustrated in the lower right of FIG. 13 on the basis of the analysis result of the utterance data D30 and the question data D4, and stores the episode data D1 in the storage unit 120 as the episode data D1 of the user U. In the episode data D1, "today" is set to the item When, "speaker" is set to the item Who, "go" is set to the item Action, "picnic" is set to the item Target, and "friends" is set to the item With, and the other items are blank.

In this manner, the information processing apparatus 100 can ask the user U a question on the basis of the question data D4 and generate the episode data D1 from the analysis result of the utterance data D30 and the question data D4 according to the question, so that it is possible to construct various episode data D1 of the user U. As a result, the information processing apparatus 100 can maintain the freshness of the episode provided to the user U by enriching the episodes that can be provided to the user U.

[Processing Procedure of the Information Processing Apparatus Regarding Generation of the Episode Data Using Related Information]

Figure 14:
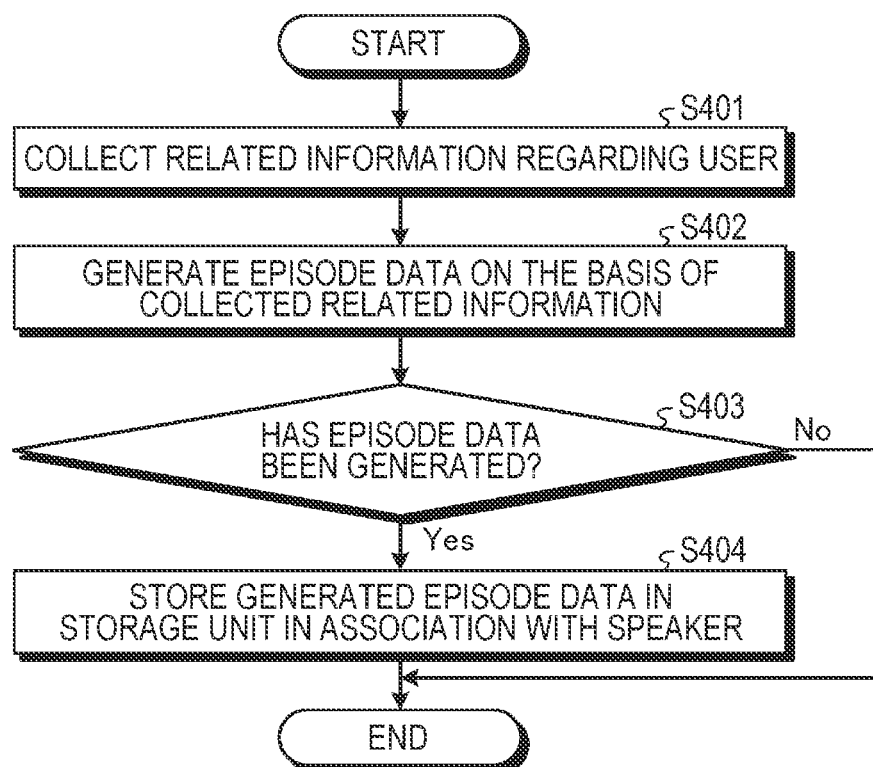
FIG. 14 is a flowchart illustrating a processing procedure regarding generation of episode data based on related information of an information processing apparatus.

FIG. 14 is a flowchart illustrating a processing procedure regarding generation of episode data based on related information of the information processing apparatus 100. The processing procedure illustrated in FIG. 14 is realized by the control unit 130 of the information processing apparatus 100 executing a program. The processing procedure illustrated in FIG. 14 is executed by the information processing apparatus 100 in a case where the user U (speaker) of the agent apparatus 10 is recognized.

As illustrated in FIG. 14, the control unit 130 of the information processing apparatus 100 collects related information regarding the user U via the communication unit 110 (step S401). The related information includes, for example, sensor information of the agent apparatus 10 indicating the situation of the user U, or the like. The related information is information for speaking the past situation of the user U as an episode. The related information includes, for example, information indicating that a friend of the user U has come, information indicating that a parent, a relative, or the like has watched television on a weekend, and the like. The related information may include, for example, information such as a schedule of the user U, a social networking service (SNS), or the like. After storing the collected related information in the storage unit 120, the control unit 130 proceeds the processing to step S402.

The control unit 130 generates the episode data D1 on the basis of the collected related information (step S402). For example, the control unit 130 analyzes the related information and generates the episode data D1 indicating the past situation on the basis of the analysis result. For example, in a case where the related information is information indicating that "A friend came yesterday", the control unit 130 generates the episode data D1 in which "yesterday" is set to the item When, "friend" is set to the item Who, "come" is set to the item Action, "home" is set to the item Where, and the other items are blank. When the processing of step S402 ends, the control unit 130 proceeds the processing to step S403.

The control unit 130 determines whether or not the episode data D1 has been generated in step S402 (step S403). In a case where it is determined that the episode data D1 is not generated (No in step S403), the control unit 130 ends the processing procedure illustrated in FIG. 14. Furthermore, in a case where it is determined that the episode data D1 has been generated (Yes in step S403), the control unit 130 proceeds the processing to step S404. The control unit 130 stores the generated episode data D1 in the storage unit 120 in association with the speaker (step S404). When the processing of step S404 ends, the control unit 130 ends the processing procedure illustrated in FIG. 14.

[Example of Use of the Episode Data Based on the Related Information]

Figure 15:
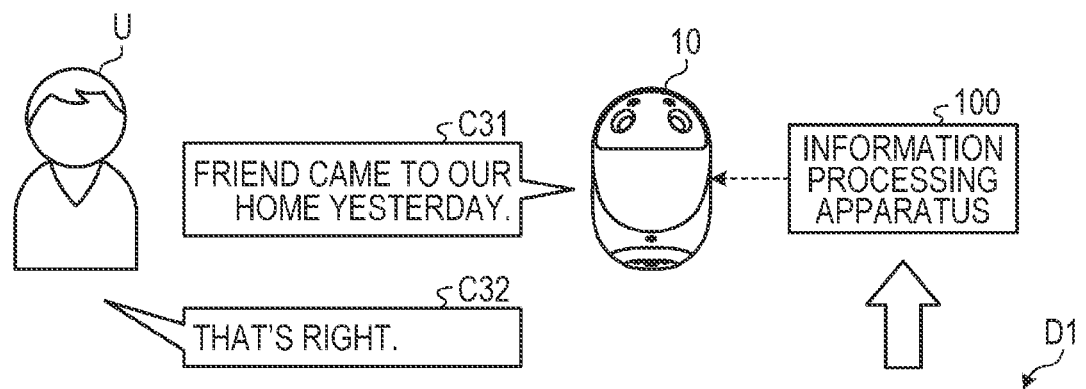
FIG. 15 is a diagram illustrating an example of use of episode data based on related information of an information processing apparatus according to an embodiment.

FIG. 15 is a diagram illustrating an example of use of the episode data based on the related information of the information processing apparatus 100 according to the embodiment.

In the example illustrated in FIG. 15, the information processing apparatus 100 generates the episode data D1 illustrated in the lower right of FIG. 15 on the basis of the collected related information, and stores the episode data D1 in the storage unit 120 as the episode data D1 of the user U. In the episode data D1, "yesterday" is set to the item When, "friend" is set to the item Who, "home" is set to the item Where, and "come" is set to the item Action, and the other items are blank.

When recognizing the user U via the agent apparatus 10, the information processing apparatus 100 generates the interaction data D5 on the basis of the episode data D1 of FIG. 15 indicating the past situation of the user U and the template data D2. The information processing apparatus 100 instructs the agent apparatus 10 to utter based on the generated interaction data D5. The agent apparatus 10 utters an utterance S31 based on the interaction data D5. The utterance C31 is, for example, "A friend came to our home yesterday.". The user U utters an utterance C32 in response to the utterance C31. The utterance C32 is, for example, "That's right.".

In this manner, since the information processing apparatus 100 can collect the related information of the user U and generate the episode data D1 on the basis of the related information, it is possible to construct the episode data D1 according to the past situation of the user U. As a result, the information processing apparatus 100 can maintain the freshness of the episode provided to the user U by further enriching the episodes that can be provided to the user U.

[Episode Data Generalization Function of the Information Processing Apparatus]

The information processing apparatus 100 further includes a function of generating generalized episode data D1 on the basis of common data of the plurality of pieces of episode data D1. FIG. 16 is a diagram for describing generalization of the plurality of pieces of episode data D1. A illustrated in FIG. 16, the information processing apparatus 100 has episode data D1 of the item Ep_id being Ep11, Ep12, and Ep13 as the episode data D1 of the user U. The episode data D1 of Ep11 is data indicating an episode "Yamada goes to the company by taxi on September 1st". The episode data D1 of Ep12 is data indicating an episode "Yamada goes to the company with a subordinate because they ran into each other on September 2nd". The episode data D1 of Ep13 is data indicating an episode "Yamada goes to the company late on September 3rd".

In this case, the information of the items Who, Where, and Action in the episode data D1 of Ep11, Ep12, and Ep13 are coincident. When the control unit 130 of the information processing apparatus 100 detects a group of episode data D1 in which the number of matching items is equal to or larger than a preset threshold value from among the plurality of pieces of episode data D1, the control unit 130 performs generalization of the episode data D1. In the example illustrated in FIG. 16, the information processing apparatus 100 generates the episode data D1 obtained by generalizing the three items Who, Where, and Action as the item Ep_id of Ep20. That is, in the episode data D1 of Ep20, "Yamada" is set to the item Who, "company" is set to the item Where, and "go" is set to the item Action, and the other items are blank.

As described above, in a case where there is a plurality of pieces of similar episode data D1, the information processing apparatus 100 can generate the episode data D1 in which the behavioral tendency of the user U is generalized. As a result, the information processing apparatus 100 can realize an interaction with the user U based on the generalized episode using the generalized episode data D1. For example, in a case where the generalized episode data D1 of Ep20 is generated, the information processing apparatus 100 can realize an interaction based on the interaction data D5 such as "Are you going to the company today?", "Are you not going to the company today?", "How was the company today?", or the like.

[Hardware Configuration]

Figure 17:
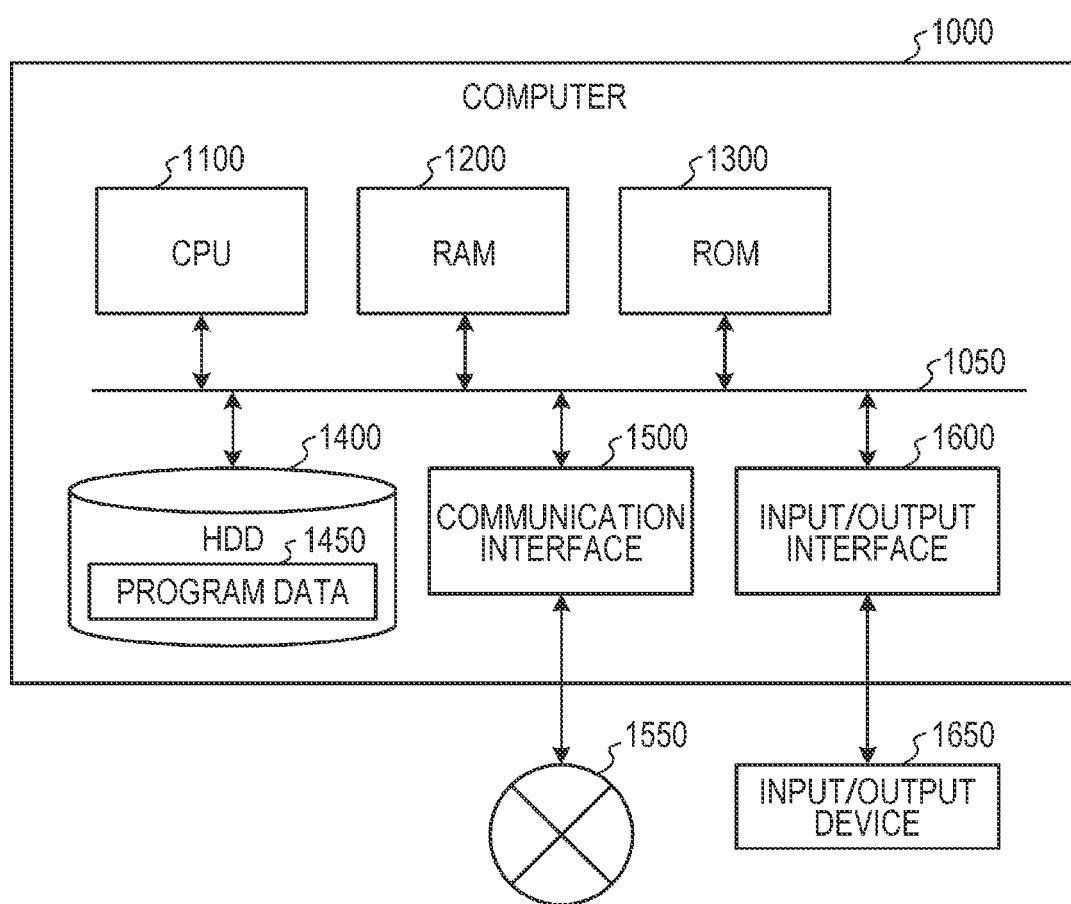
FIG. 17 is a hardware configuration diagram illustrating an example of a computer that realizes functions of an information processing apparatus.

An information device of the information processing system 1 according to the above-described embodiment is realized by, for example, a computer 1000 having a configuration as illustrated in FIG. 17. Next, the information processing apparatus 100 according to the embodiment is described as an example. FIG. 17 is a hardware configuration diagram illustrating an example of the computer 1000 that realizes the functions of the information processing apparatus 100. The computer 1000 includes a CPU 1100, RAM 1200, read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 loads a program stored in the ROM 1300 or the HDD 1400 onto the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transitory records a program executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from the input device such as a keyboard and a mouse via the input/output interface 1600. Furthermore, the CPU 1100 transmits data to the output device such as a display, a speaker, or a printer via the input/output interface 1600. Furthermore, the input/output interface 1600 may function as a media interface that reads a program or the like recorded in a predetermined recording medium (media). The media is, for example, an optical recording medium such as a digital versatile disc (DVD), a magneto-optical recording medium such as a magneto-optical disk (MO), a tape medium, a magnetic recording medium, semiconductor memory, or the like.

For example, in a case where the computer 1000 functions as the information processing apparatus 100 according to the embodiment, the CPU 1100 of the computer 1000 executes the information processing program loaded on the RAM 1200 to realize the functions of the recognition unit 131, the acquisition unit 132, the interaction control unit 133, the generation unit 134, the collection unit 135, the operation control unit 140, and the like. Furthermore, the HDD 1400 stores the information processing program according to the present disclosure and data in the storage unit 120. Note that the CPU 1100 reads the program data 1450 from the HDD 1400 and executes the program data, but as another example, the program may be acquired from another apparatus via the external network 1550.

In the present embodiment described above, the case where the agent apparatus 10 and the information processing apparatus 100 cooperate with each other to execute the interaction processing in the information processing system 1 has been described, but it is not limited thereto. For example, in the information processing system 1, the agent apparatus 10 may independently execute the interaction processing. In this case, in the agent apparatus 10, it is sufficient if the acquisition unit 132, the interaction control unit 133, the generation unit 134, the collection unit 135, the operation control unit 140, and the like of the information processing apparatus 100 are realized by the control unit 16.

The preferred embodiment of the present disclosure has been described above with reference to the accompanying drawings, while the technical scope of the present disclosure is not limited to the above examples. It is apparent that a person having normal knowledge in the technical field of the present disclosure may find various alterations and modifications within the scope of the technical idea stated in the claims, and it should be understood that they will naturally come under the technical scope of the present disclosure.

Furthermore, the effects described in the present specification are merely illustrative or exemplified effects, and are not limitative. That is, with or in the place of the above effects, the technology according to the present disclosure may achieve other effects that are clear to those skilled in the art from the description of the present specification.

Furthermore, it is also possible to create a program for causing the hardware such as the CPU, the ROM, and the RAM built in the computer to exhibit a function equivalent to the configuration of the information processing apparatus 100, and a computer-readable recording medium recording the program can also be provided.

Furthermore, each step of the processing of the information processing apparatus 100 of the present specification is not necessarily needed to be processed in chronological order along the order described in the flowcharts. For example, each step of the processing of the information processing apparatus 100 may be processed in an order that differs from the order described in the flowcharts or may be processed in parallel.

The case where the information processing apparatus 100 of the present specification provides the episode data D1 by interaction (voice) with the user U via the agent apparatus 10 has been described, but it is not limited thereto. For example, the information processing apparatus 100 may be configured to provide the episode data D1 via the display apparatus or provide the episode data D1 by a combination of display and voice output.

(Effects)

The information processing apparatus 100 includes the acquisition unit 132 that acquires, from the storage unit 120 that stores the episode data D1 of the speaker, the episode data D1 regarding the topic information included in the utterance data D30 of the speaker, and the interaction control unit 133 that controls an interaction with the speaker so as to include an episode based on the episode data D1.

Therefore, when acquiring the episode data D1 regarding the topic information included in the utterance data D30 of the speaker, the information processing apparatus 100 can realize an interaction including the episode of the speaker based on the episode data D1. The information processing apparatus 100 can provide the episode based on the episode data D1 of the speaker in the interaction with the speaker. As a result, the information processing apparatus 100 can realize an interaction with which the speaker has a sense of affinity by including the episode of the speaker in the interaction.

In the information processing apparatus 100, the interaction control unit 133 generates the interaction data D5 including an episode on the basis of the episode data D1 and an algorithm for generating an interactive sentence, and controls the interaction on the basis of the interaction data D5.

Therefore, the information processing apparatus 100 can generate the interaction data D5 including the episode of the speaker on the basis of the episode data D1 and the algorithm, so that the configuration of the episode data D1 can be simplified. As a result, since the information processing apparatus 100 can construct various episode data D1 of the speaker, it is possible to include various episodes in the interaction with the speaker, and it is possible to realize an interaction with which the speaker has a further sense of affinity.

In the information processing apparatus 100, the algorithm includes a template according to the classification of the episode, and the interaction control unit 133 sets the data of the episode data D1 to the template and generates the interaction data D5.

Therefore, the information processing apparatus 100 can generate the interaction data D5 by setting the data of the episode data D1 to the template, so that the processing of generating the episode data D1 can be simplified. Furthermore, the information processing apparatus 100 can acquire the episode data D1 suitable for the utterance content of the speaker by classifying the episode data D1. As a result, since the episode suitable for the utterance content of the speaker can be included in the interaction, the information processing apparatus 100 can realize an interaction with which the speaker has a further sense of affinity.

In the information processing apparatus 100, the acquisition unit 132 acquires the episode data D1 in which the topic information satisfies the interaction condition.

Therefore, the information processing apparatus 100 can acquire the episode data D1 suitable for the topic information according to the interaction condition and generate the interaction data D5 based on the episode data D1. As a result, since the episode satisfying the interaction condition can be included in the interaction, the information processing apparatus 100 can realize an interaction with which the speaker has a further sense of affinity.

In the information processing apparatus 100, in a case where the speaker is recognized, the acquisition unit 132 acquires the episode data D1 satisfying the acquisition condition, and the interaction control unit 133 controls the interaction with the speaker so as to spontaneously utter the episode indicated by the acquired episode data D1.

Therefore, the information processing apparatus 100 can acquire the episode data D1 satisfying the acquisition condition regardless of the utterance of the speaker and spontaneously provide the episode based on the episode data D1. Furthermore, since the information processing apparatus 100 can acquire various episode data D1 depending on the acquisition condition, it is possible to spontaneously provide various episodes. As a result, since the information processing apparatus 100 can provide the episode of the speaker even in a state of not interacting with the speaker, it is possible to give the speaker a sense of affinity.

In the information processing apparatus 100, the interaction control unit 133 controls an interaction with the speaker on the basis of the interaction data D5 different from the episode in a case where the acquisition unit 132 has not acquired the episode data D1.

Therefore, when not acquiring the episode data D1 suitable for the utterance content of the speaker, the information processing apparatus 100 can realize the interaction based on the interaction data D5 not including the episode. As a result, in a case where there is no episode suitable for the utterance content of the speaker, the information processing apparatus 100 can suppress interruption of the interaction with the speaker by performing an interaction different from the episode.

The information processing apparatus 100 further include the generation unit 134 that generates the episode data D1 on the basis of the analysis result of the utterance data D30 and the storage unit 120 that stores the episode data D1 in association with the speaker.

Therefore, when generating the episode data D1 on the basis of the analysis result of the utterance data D30 of the speaker, the information processing apparatus 100 can store the episode data D1 in association with the speaker in the storage unit 120. As a result, the information processing apparatus 100 can enrich the episodes to be included in the interaction with the speaker by constructing the episode data D1 according to the utterance content of the speaker, and thus, it is possible to realize an interaction with which the speaker has a further sense of affinity.

In the information processing apparatus 100, the interaction control unit 133 controls the interaction with the speaker on the basis of the question data D4 for asking the speaker a question, and the generation unit 134 generates the episode data D1 on the basis of the analysis result of the utterance data D30 corresponding to the question data D4 and the question data D4.

Therefore, the information processing apparatus 100 can ask the speaker a question on the basis of the question data D4 and generate the episode data D1 from the analysis result of the utterance data D30 and the question data D4 according to the question, so that it is possible to construct various episode data D1 of the speaker. As a result, the information processing apparatus 100 can maintain the freshness of the episode provided to the speaker by enriching the episodes that can be provided to the speaker.

The information processing apparatus 100 further includes the collection unit 135 that collects the related information regarding the past situation of the speaker, and the generation unit 134 generates the episode data D1 on the basis of the related information.

Therefore, since the information processing apparatus 100 can collect the related information of the speaker and generate the episode data D1 on the basis of the related information, it is possible to construct the episode data D1 according to the past situation of the speaker. As a result, the information processing apparatus 100 can maintain the freshness of the episode provided to the speaker by further enriching the episodes that can be provided to the speaker.

In the information processing apparatus 100, the generation unit 134 generates generalized episode data d1 on the basis of common data of the episode data D1 of the storage unit 120.

Therefore, when data common to the episode data D1 of the speaker is included, the information processing apparatus 100 can generate the episode data D1 obtained by generalizing the common data. As a result, since the information processing apparatus 100 can realize an interaction including generalized episodes of the speaker, it is possible to provide an interaction with a sense of affinity without interrupting the interaction with the speaker.

The information processing system 1 is an information processing system 1 including the agent apparatus 10 that collects the utterance data D30 of the speaker and the information processing apparatus 100, in which the information processing apparatus 100 includes the acquisition unit 132 that acquires, from the storage unit 120 that stores the episode data D1 of the speaker, the episode data D1 regarding the topic information included in the utterance data D30, and the interaction control unit 133 that controls an interaction with the speaker so as to include an episode based on the episode data D1.

Therefore, when acquiring the episode data D1 regarding the topic information included in the utterance data D30 of the speaker, the information processing system 1 can realize an interaction including the episode of the speaker based on the episode data D1. The information processing system 1 can provide the episode based on the episode data D1 of the speaker in the interaction with the speaker. As a result, the information processing system 1 can realize an interaction with which the speaker has a sense of affinity by including the episode of the speaker in the interaction.

In the information processing system 1, the agent apparatus 10 is a movable robot, and the interaction control unit 133 controls an interaction with the speaker via the agent apparatus 10.

Therefore, the information processing system 1 can collect the utterance data D30 of the speaker via the agent apparatus 10 and realize an interaction including an episode of the speaker based on the episode data D1. As a result, the information processing system 1 can realize an interaction with a sense of affinity between the speaker and the robot by including the episode of the speaker in the interaction with the movable robot.

The information processing method includes, by a computer, acquiring, from the storage unit 120 that stores the episode data D1 of the speaker, the episode data D1 regarding the topic information included in the utterance data D30 of the speaker, and controlling an interaction with the speaker so as to include an episode based on the episode data D1.

Therefore, when acquiring the episode data D1 regarding the topic information included in the utterance data D30 of the speaker, the information processing method can realize, by a computer, an interaction including the episode of the speaker based on the episode data D1. The information processing method can provide the episode based on the episode data D1 of the speaker in the interaction with the speaker. As a result, the information processing method can realize, by a computer, an interaction with which the speaker has a sense of affinity by including the episode of the speaker in the interaction.

Note that the configuration below also falls within the technical scope of the present disclosure.

(1)
An information processing apparatus including:
an acquisition unit that acquires, from a storage unit that stores episode data of a speaker, the episode data regarding topic information included in utterance data of the speaker; and
an interaction control unit that controls an interaction with the speaker so as to include an episode based on the episode data.

(2)
The information processing apparatus according to (1), in which
the interaction control unit generates interaction data including the episode on the basis of the episode data and an algorithm for generating an interactive sentence, and controls the interaction on the basis of the interaction data.

(3)
The information processing apparatus according to (2), in which
the algorithm includes a template according to a classification of the episode, and
the interaction control unit sets data of the episode data to the template and generates the interaction data.

(4)
The information processing apparatus according to any of (1) to (3), in which
the acquisition unit acquires the episode data in which the topic information satisfies an interaction condition.

(5)
The information processing apparatus according to (4), in which
in a case where the speaker is recognized, the acquisition unit acquires the episode data satisfying an acquisition condition, and
the interaction control unit controls an interaction with the speaker so as to spontaneously utter the episode indicated by the acquired episode data.

(6)
The information processing apparatus according to any of (1) to (5), in which
the interaction control unit controls an interaction with the speaker on the basis of interaction data different from the episode in a case where the acquisition unit has not acquired the episode data.

(7)
The information processing apparatus according to any of (1) to (6), further including:
a generation unit that generates the episode data on the basis of an analysis result of the utterance data; and
a storage unit that stores the episode data in association with the speaker.

(8)
The information processing apparatus according to (7), in which
the interaction control unit controls an interaction with the speaker on the basis of question data for asking the speaker a question, and
the generation unit generates the episode data on the basis of the analysis result of the utterance data corresponding to the question data and the question data.

(9)
The information processing apparatus according to (8), further including:
a collection unit that collects related information regarding a past situation of the speaker, in which
the generation unit generates the episode data on the basis of the related information.

(10)
The information processing apparatus according to (8) or (9), in which
the generation unit generates the episode data generalized on the basis of common data of the episode data of the storage unit.

(11)
An information processing system including an agent apparatus that collects utterance data of a speaker and an information processing apparatus, the information processing apparatus including:

an acquisition unit that acquires, from a storage unit that stores episode data of the speaker, the episode data regarding topic information included in the utterance data; and an interaction control unit that controls an interaction with the speaker so as to include an episode based on the episode data.

(12)

The information processing system according to (11), in which the agent apparatus is a movable robot, and the interaction control unit controls an interaction with the speaker via the agent apparatus.

(13)

An information processing method including, by a computer:

acquiring, from a storage unit that stores episode data of a speaker, the episode data regarding topic information included in utterance data of the speaker; and controlling an interaction with the speaker so as to include an episode based on the episode data.

(14)

A computer-readable recording medium recording a program for causing a computer to realize:

acquiring, from a storage unit that stores episode data of a speaker, the episode data regarding topic information included in utterance data of the speaker; and controlling an interaction with the speaker so as to include an episode based on the episode data.

(15)

A program for causing a computer to realize:

acquiring, from a storage unit that stores episode data of a speaker, the episode data regarding to topic information included in utterance data of the speaker; and controlling an interaction with the speaker so as to include an episode based on the episode data.

REFERENCE SIGNS LIST

1 Information processing system
10 Agent apparatus
11 Sensor unit
12 Input unit
13 Light source
14 Output unit
15 Drive unit
16 Control unit
17 Communication unit
100 Information processing apparatus
110 Communication unit
120 Storage unit
130 Control unit
131 Recognition unit
132 Acquisition unit
133 Interaction control unit
134 Generation unit
135 Collection unit
140 Operation control unit
D1 Episode data
D2 Template data
D3 User data
D4 Question data
D5 Interaction data
D10 Knowledge data
D20 Management data
D30 Utterance data

The invention claimed is:

1. An information processing apparatus, comprising:
a central processing unit (CPU) configured to:
acquire sensor information and episode data from an agent apparatus, wherein
each of the sensor information and the episode data is associated with a speaker,
the episode data includes topic information,
the topic information is associated with utterance data of the speaker;
authenticate the speaker based on the sensor information;
control a first interaction with the speaker based on the episode data; and
add a specific episode in the episode data based on the authenticated speaker, wherein the specific episode is associated with the speaker.

2. The information processing apparatus according to claim 1, wherein the CPU is further configured to:
generate interaction data based on of the episode data and a specific algorithm;
generate an interactive sentence based on the specific algorithm; and
control the first interaction based on the generated interaction data.

3. The information processing apparatus according to claim 2, wherein
the specific algorithm includes a template,
the template is associated with a classification of the specific episode, and
the CPU is further configured to set specific data of the episode data based on the template.

4. The information processing apparatus according to claim 3, wherein the topic information satisfies an interaction condition associated with the episode data.

5. The information processing apparatus according to claim 4, wherein the CPU is further configured to:
acquire the episode data based on the authentication of the speaker and an acquisition condition, wherein the acquisition condition is associated with the episode data;
control a second interaction with the speaker; and
spontaneously output the specific episode based on the second interaction.

6. The information processing apparatus according to claim 5, wherein the CPU is further configured to:
control a third interaction with the speaker based on
the interaction data different from the specific episode, and
non-acquisition of the episode data.

7. The information processing apparatus according to claim 1, wherein the CPU is further configured to:
store analysis information that comprises an analysis result, wherein the analysis result is associated with the utterance data;
generate the episode data based on the analysis result; and
store the episode data in association with the speaker.

8. The information processing apparatus according to claim 7, wherein the CPU is further configured to:
control a second interaction with the speaker based on question data associated with the speaker; and
generate the episode data based on the analysis result of the utterance data, wherein the utterance data corresponds to the question data.

9. The information processing apparatus according to claim 8, wherein the CPU is further configured to:
acquire related information regarding a past situation of the speaker; and generate the episode data based on the related information.

10. The information processing apparatus according to claim 9, wherein the CPU is further configured to:
store common data associated with a plurality of pieces of the episode data; and
generate the episode data based generalized on the common data.

11. An information processing system, comprising:
an agent apparatus configured to receive utterance data of a speaker; and
an information processing apparatus that includes a central processing unit (CPU), wherein the CPU is configured to
acquire sensor information and episode data from the agent apparatus, wherein
each of the sensor information and the episode data is associated with the speaker,
the episode data includes topic information, and
the topic information is associated with the utterance data;
authenticate the speaker based on the sensor information;
control an interaction with the speaker based on the episode data; and
add a specific episode in the episode data based on the authenticated speaker, wherein the specific episode is associated with the speaker.

12. The information processing system according to claim 11, wherein
the agent apparatus is a movable robot,
the CPU is further configured to control the interaction with the speaker via the agent apparatus.

13. A non-transitory computer-readable medium having stored thereon, computer-executable instructions which, when executed by a computer, cause the computer to execute operations, the operations comprising:
acquiring sensor information and episode data from an agent apparatus, wherein
each of the sensor information and the episode data is associated with a speaker,
the episode data includes topic information,
the topic information is associated with utterance data of the speaker;
authenticating the speaker based on the sensor information;
controlling an interaction with the speaker based on the episode data; and
adding a specific episode in the episode data based on the authenticated speaker, wherein the specific episode is associated with the speaker.

* * * * *